(12) United States Patent
Kim et al.

(10) Patent No.: US 8,711,316 B2
(45) Date of Patent: Apr. 29, 2014

(54) LIQUID CRYSTAL DISPLAY AND MANUFACTURING METHOD THEREOF

(71) Applicant: Samsung Display Co., Ltd., Yongin (KR)

(72) Inventors: Dong-Gyu Kim, Yongin-si (KR); Sung-Jae Moon, Seoul (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 13/780,321

(22) Filed: Feb. 28, 2013

(65) Prior Publication Data

US 2013/0194527 A1     Aug. 1, 2013

Related U.S. Application Data

(63) Continuation of application No. 11/692,971, filed on Mar. 29, 2007, now Pat. No. 8,395,743.

(30) Foreign Application Priority Data

Mar. 29, 2006 (KR) ........................ 10-2006-0028252

(51) Int. Cl.
*G02F 1/1343*     (2006.01)
(52) U.S. Cl.
USPC ............................ 349/146; 349/142; 349/144

(58) Field of Classification Search
USPC .......................................... 349/139, 141–146
See application file for complete search history.

(56) References Cited

U.S. PATENT DOCUMENTS

| | | | |
|---|---|---|---|
| 7,209,205 B2 * | 4/2007 | Yoshida et al. | 349/139 |
| 7,656,486 B2 | 2/2010 | Tasaka et al. | |
| 2003/0086044 A1 * | 5/2003 | Inoue et al. | 349/141 |
| 2005/0036091 A1 | 2/2005 | Song | |
| 2005/0078263 A1 | 4/2005 | Kim et al. | |
| 2006/0066795 A1 | 3/2006 | Hsu et al. | |
| 2006/0146243 A1 | 7/2006 | Nakanishi et al. | |

FOREIGN PATENT DOCUMENTS

| | | |
|---|---|---|
| JP | 2005062882 A | 3/2005 |
| JP | 2005215586 A | 8/2005 |
| KR | 1020050018100 A | 2/2005 |

* cited by examiner

*Primary Examiner* — Bumsuk Won
*Assistant Examiner* — Charles Chang
(74) *Attorney, Agent, or Firm* — Cantor Colburn LLP

(57) ABSTRACT

A liquid crystal display includes a substrate, a plurality of pixel electrodes formed on the substrate, a common electrode facing the pixel electrodes, and a liquid crystal layer interposed between the pixel electrodes and the common electrode. The pixel electrode includes at least one oblique edge including a plurality of protruded and depressed portions.

14 Claims, 19 Drawing Sheets

FIG.12

| | Exemplary embodiment 1 | Exemplary embodiment 2 | Exemplary embodiment 3 | Exemplary embodiment 4 | Exemplary embodiment 5 | Exemplary embodiment 6 | Exemplary embodiment 7 | Exemplary embodiment 8 | Exemplary embodiment 9 | Exemplary embodiment 10 | Exemplary embodiment 11 | Exemplary embodiment 12 |
|---|---|---|---|---|---|---|---|---|---|---|---|---|
| Protruded and depressed portions | X | O | O | X | O | O | X | O | O | First sub-pixel: X second sub-pixel: O | X | X |
| D(μm) | 33 | | | 33 | | | 27 | | | First sub-pixel: 33 | | |
| L(μm) | | 4 | 4 | | 4 | 4 | | 5 | 5 | | 5 | 5 |
| S:L | | 1.5:1 | 1:1 | | 2:1 | 1.5:1 | | 1.5:1 | 1:1 | | 1.5:1 | 1:1 |
| F:B | | 1:1 | 1:1 | | 1:1 | 1:0.3 | | 1:1 | 1:1 | | 1:0.3 | 1:0.3 |
| Shape of protrusion | rectangular | rectangular | rectangular | Triangular | rectangular | rectangular | rectangular | rectangular | rectangular | | rectangular | rectangular |

LIQUID CRYSTAL DISPLAY AND MANUFACTURING METHOD THEREOF

CROSS REFERENCE TO RELATED APPLICATIONS

This application is a continuation application of U.S. application Ser. No. 11/692,971, filed on Mar. 29, 2007, and issued as U.S. Pat. No. 8,395,743, and claims priority to Korean Patent Application No. 10-2006-0028252 filed on Mar. 29, 2006, and all the benefits accruing therefrom under 35 U.S.C. §119, the entire contents of which are incorporated herein by reference in their entirety.

BACKGROUND OF THE INVENTION (a) Field of the Invention

The present invention relates to a liquid crystal display.

(b) Description of the Related Art

Liquid crystal displays ("LCDs") are one of the most widely used flat panel displays. An LCD includes a pair of panels provided with field-generating electrodes, such as pixel electrodes and a common electrode, and a liquid crystal ("LC") layer interposed between the two panels. The LCD displays images by applying voltages to the field-generating electrodes to generate an electric field in the LC layer that determines the orientations of LC molecules therein to adjust polarization of incident light.

An LCD also includes switching elements connected to the respective pixel electrodes and a plurality of signal lines such as gate lines and data lines for controlling the switching elements and thereby applying voltages to the pixel electrodes.

Among the LCDs, a vertically aligned mode LCD, which aligns the major axes of the LC molecules perpendicular to the upper and lower panels in the absence of an electric field, is spotlighted because of its high contrast ratio and wide reference viewing angle. Here, the reference viewing angle is defined as a viewing angle making the contrast ratio equal to 1:10 or as a limit angle for the inversion in luminance between the grays.

To implement wide viewing angle in the vertically aligned mode LCD, cutouts are provided in the field generating electrodes or protrusions are provided on the field generating electrodes. Since the cutouts and the protrusions can determine the tilt directions of the LC molecules, the tilt directions can be distributed into several directions by using cutouts and protrusions, thereby giving a wide reference viewing angle.

However, an increase in the number of cutouts and protrusions reduces the transmittance since it is hard for light to transmit where the cutouts or the protrusions are located. In order to increase the aperture ratio, an ultrahigh aperture ratio structure, in which the size of the pixel electrodes is increased, has been suggested. However, in this case, the LC molecules located in the central area of the pixel electrode are hardly affected by the electric field near the edges of the pixel electrode, which causes a disorder of the orientations of the LC molecules, and as a result, texture or light leakage occurs and the response time increases.

Therefore, a display device is required with improved response speed and transmittance of an LCD as well as an increase the aperture ratio of the LCD.

BRIEF SUMMARY OF THE INVENTION

An exemplary embodiment provides a liquid crystal display having advantages of improved response speed and transmittance, and an increased aperture ratio.

An exemplary embodiment provides a liquid crystal display including a substrate, a plurality of pixel electrodes formed on the substrate, a common electrode facing the pixel electrodes, and a liquid crystal layer interposed between the pixel electrodes and the common electrode. The pixel electrode includes at least one oblique edge including a plurality of protruded and depressed portions.

In an exemplary embodiment, a width L of the protruded portion, a distance S between two neighboring edges of two adjacent protruded portions, and a thickness d of the liquid crystal layer may satisfy the following relation: $S+L \leq 2d$ In an exemplary embodiment, an area of the protruded portions may be smaller than a half of the entire area of the pixel electrode.

In an exemplary embodiment, he width L of the protruded portion and the distance S between the two neighboring edges of the two adjacent protruded portions may be different from each other.

In an exemplary embodiment, the distance S between the two neighboring edges of the two adjacent protruded portions may be greater than the width L of the protruded portion In an exemplary embodiment, the pixel electrode includes at least two parallelogrammic electrode pieces of which the inclination directions may be different from each other.

In an exemplary embodiment, the pixel electrode may include a first sub-pixel electrode and a second sub-pixel electrode.

In an exemplary embodiment, each of the first and second sub-pixel electrodes may include at least two parallelogrammic electrode pieces of which the inclination directions are different from each other.

In an exemplary embodiment, tilt directions of at least two of the protruded portions formed where the two parallelogrammic electrode pieces meet each other may be different from each other.

In an exemplary embodiment, the first sub-pixel electrode may include a right-inclined parallelogrammic electrode piece and a left-inclined parallelogrammic electrode piece, and the second sub-pixel electrode may include three right-inclined parallelogrammic electrode pieces and three left-inclined parallelogrammic electrode pieces.

In an exemplary embodiment, the right-inclined parallelogrammic electrode piece and the left-inclined parallelogrammic electrode piece may be alternately arranged in a longitudinal direction of the first sub-pixel electrode and the second sub-pixel electrode.

In an exemplary embodiment, an area of the second sub-pixel electrode may be larger than an area of the first sub-pixel electrode.

In an exemplary embodiment, a voltage of the first sub-pixel electrode may be different from a voltage of the second sub-pixel electrode.

In an exemplary embodiment, the liquid crystal display may further include a first thin film transistor connected to the first sub-pixel electrode, a second thin film transistor connected to the second sub-pixel electrode, a first gate line connected to the first thin film transistor, a second gate line connected to the second thin film transistor, and a data line connected to the first and second thin film transistors and intersecting the first and second gate lines.

In an exemplary embodiment, the first and second thin film transistors may be turned on in response to signals from the first and second gate lines and may transmit signals from the data line, respectively.

In an exemplary embodiment, the liquid crystal display may further include an organic layer formed between the data line and the pixel electrodes, In an exemplary embodiment, a ratio of a width L of the protruded portion and a distance S between two neighboring edges of two adjacent protrusions may be different from one another according to a position of the pixel electrode.

In an exemplary embodiment, the liquid crystal display may further include a tilt direction determining member formed in the common electrode.

In an exemplary embodiment, the tilt direction determining member may include a cutout including an oblique portion.

In an exemplary embodiment, the protruded portion may be rectangular.

An exemplary embodiment provides a liquid crystal display including a substrate, a plurality of pixel electrodes formed on the substrate, a common electrode facing the pixel electrodes, and a liquid crystal layer interposed between the pixel electrodes and the common electrode. Each of the pixel electrodes includes a first and a second sub-pixel electrode. At least one of the first and second sub-pixel electrodes includes at least an edge having protruded and depressed portions.

In an exemplary embodiment, a width L of the protruded portion, a distance S between two neighboring edges of two adjacent protrusions, and a thickness d of the liquid crystal layer may satisfy the following relation: $S+L \leq 2d$ In an exemplary embodiment, an area of the protruded and depressed portions may be smaller than a half of the entire area of the pixel electrode.

An exemplary embodiment provides method of manufacturing a liquid crystal display. The method includes forming a plurality of pixel electrodes on a substrate, disposing a common electrode facing the plurality of pixel electrodes and interposing a liquid crystal layer between the pixel electrodes and the common electrode. The forming a plurality of pixel electrodes includes forming an oblique edge including a plurality of protruded and depressed portions on each pixel electrode.

An exemplary embodiment provides a method of forming manufacturing a liquid crystal display. The method includes forming a plurality of pixel electrodes on a substrate, disposing a common electrode facing the pixel electrodes and interposing a liquid crystal layer between the pixel electrodes and the common electrode. Each of the pixel electrodes including a first sub-pixel electrode and a second sub-pixel electrode. The forming a plurality of pixel electrodes includes forming an oblique edge including a plurality of protruded and depressed portions on one of the first sub-pixel electrode and the second sub-pixel electrode.

BRIEF DESCRIPTION OF THE DRAWINGS

FIG. 12 is a graph illustrating conditions of exemplary embodiments of LCDs according to the present invention;

DETAILED DESCRIPTION OF THE INVENTION

Figure 1:
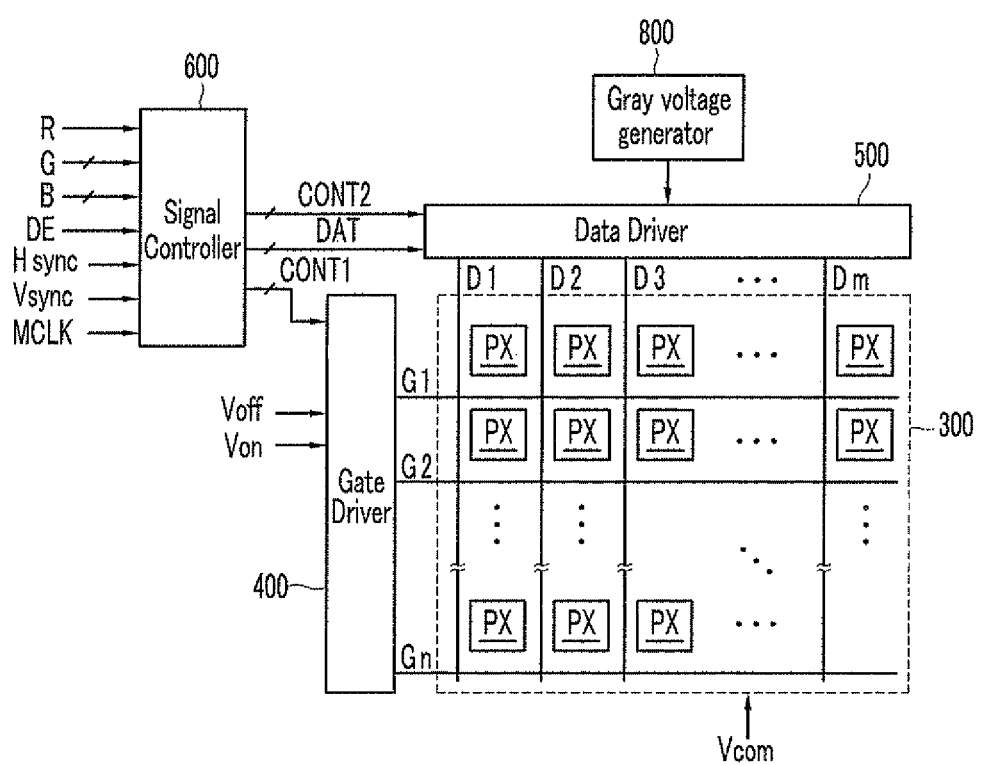
FIG. 1 is a block diagram of an exemplary embodiment of an LCD according to present invention.

An exemplary embodiment of the present invention will hereinafter be described in detail with reference to the accompanying drawings.

The present invention will be described more fully hereinafter with reference to the accompanying drawings, in which preferred embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "mounted to" another element, it can be directly on the other element or intervening elements may also be present. In contrast, when an element is referred to as being "directly on" or "directly mounted to" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section, Thus, a first element, component, region, layer or section discussed below could be termed a second element, component, region, layer or section without departing from the teachings of the present invention.

Spatially relative terms, such as "below", "lower", "under," "above", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the present invention will be described in detail with reference to the accompanying drawings.

Now, LCDs according to embodiments of the present invention will be described in detail with reference to the accompanying drawings.

An LCD according to an exemplary embodiment of the present invention will be described in detail with reference to FIG. 1 and FIG. 2.

Figure 2:
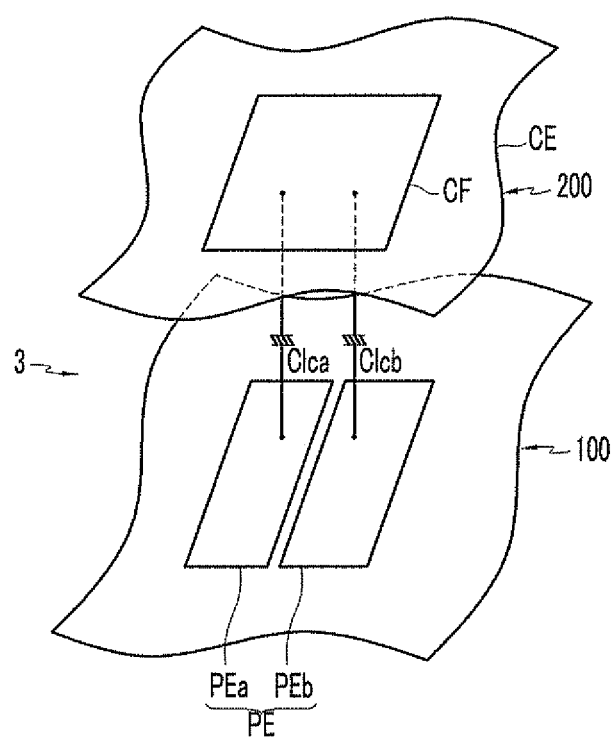
FIG. 2 is an equivalent circuit diagram of an exemplary embodiment of two sub-pixels of an LCD according to the present invention.

FIG. 1 is a block diagram of an exemplary embodiment of an LCD according to the present invention, and FIG. 2 is an equivalent circuit diagram of an exemplary embodiment of a pixel of an LCD according to the present invention, As shown in FIG. 1, an LCD includes a liquid crystal panel assembly 300, a gate driver 400 and a data driver 500 that are connected to the liquid crystal panel assembly 300, a gray voltage generator 800 connected to the data driver 500, and a signal controller 600 for controlling the above elements.

The liquid crystal panel assembly 300 includes a plurality of signal lines $G_1$-$G_n$ and $D_1$-$D_m$, and a plurality of pixels PX connected to the signal lines and arranged substantially in a matrix, as seen in the equivalent circuit diagram. The liquid crystal panel assembly 300 includes lower and upper panels 100 and 200 that face each other with a liquid crystal layer 3 interposed therebetween, in a structural view shown in FIG. 2.

The signal lines $G_1$-$G_n$ and $D_1$-$D_m$ include a plurality of gate lines $G_1$-$G_n$ for transmitting gate signals (also referred to as "scanning signals") and a plurality of data lines $D_1$-$D_m$ for transmitting data signals. The gate lines $G_1$-$G_n$ extend substantially in a row direction and substantially parallel to each other, and the data lines $D_1$-$D_m$ extend substantially in a column direction and substantially parallel to each other, Each pixel PX includes a pair of sub-pixels, and each sub-pixel includes an LC capacitor Clca or Clcb. At least one of the two sub-pixels includes a switching element (not shown) connected to a gate line, a data line, and an LC capacitor Clca or Clcb.

The LC capacitor Clca/Clcb includes a sub-pixel electrode PEa/PEb provided on a lower panel 100 and a common electrode CE provided on the upper panel 200 as two terminals, and the LC layer 3 disposed between the sub-pixel electrode PEa/Peb. The common electrode CE functions as a dielectric of the LC capacitor Clca/Clcb. The sub-pixel electrodes PEa and PEb are separated from each other and form a pixel electrode PE as a pair. The common electrode CE covers an entire surface of the upper panel 200 and supplied with a common voltage Vcom. The LC layer 3 has negative dielectric anisotropy, and the LC molecules in the LC layer 3 may be oriented so that their long axes are substantially perpendicular to the surfaces of the two panels in the absence of an electric field.

In order to implement color display, each pixel PX displays one of primary colors (spatial division) or each pixel PX sequentially displays the primary colors in turn (temporal division) such that the spatial or temporal sum of the primary colors are recognized as a desired color. The primary colors may include red, green, and blue colors. FIG. 2 shows an exemplary embodiment of the spatial division in which each pixel PX includes a color filter CF representing one of the primary colors in an area of the upper panel 200. Unlike FIG. 2, in an alternative exemplary embodiment, the color filter CF may be provided on or under the sub-pixel electrode PEa/PEb provided on the lower panel 100.

In exemplary embodiments, a pair of polarizers (not shown) are provided on the outer surface of the panels 100 and 200, and the polarization axes of two polarizers may be perpendicular to each other. One of the two polarizers may be omitted when the LCD is a reflective LCD. In the case of perpendicular polarizers, light that is incident into the LC layer 3 in the absence of an electric field cannot pass through the polarizer.

Referring to FIG. 1 again, the gray voltage generator 800 generates a plurality of gray voltages (or reference gray voltages) related to the transmittance of the pixels PX. The gray voltage generator 800 may generate only a given number of gray voltages (referred to as reference gray voltages) instead of generating all of the gray voltages.

The gate driver 400 is connected to the gate lines $G_1$-$G_n$ of the LC panel assembly 300 and synthesizes a gate-on voltage Von and a gate-off voltage Voff to generate gate signals Vg, which are applied to the gate lines $G_1$-$G_n$.

The data driver 500 is connected to the data lines $D_1$-$D_m$ of the LC panel assembly 300 and selects the gray voltages supplied from the gray voltage generator 800 and then applies the selected gray voltage to the data lines $D_1$-$D_m$ as data signals. When the gray voltage generator 800 generates only reference gray voltages of a predetermined number rather than supplying voltages for all grays, the data driver 500 divides the reference gray voltages to generate gray voltages for all grays, from which data signals are selected.

The signal controller 600 controls the gate driver 400 and the data driver 500.

In exemplary embodiments, the drivers 400, 500, 600 and/or 800 may be directly mounted on the LC panel assembly 300 in the form of at least one integrated circuit ("IC") chip. Alternatively, the drivers 400, 500, 600 and/or 800 may be mounted on a flexible printed circuit film (not shown) of a tape carrier package ("TCP") type which is attached to the LC panel assembly 300. Alternatively, the drivers 400, 500, 600 and/or 800 may be mounted on a separate printed circuit board (not shown). Alternatively, the drivers 400, 500, 600 and/or 800 may be integrated into the LC panel assembly 300. Alternatively, the drivers 400, 500, 600 and/or 800 may be integrated into a single chip where at least one of the drivers 400, 500, 600 and 800 or at least one circuit element forming them may be located outside of the single chip. As used herein, "integrated" is used to indicate formed to be a single unit or piece rather than combining separate elements.

An exemplary embodiment of an LC panel assembly according to the present invention will now be described in detail with reference to FIG. 3 to FIG. 8, along with FIG. 1 and FIG. 2 described above.

Figure 3:
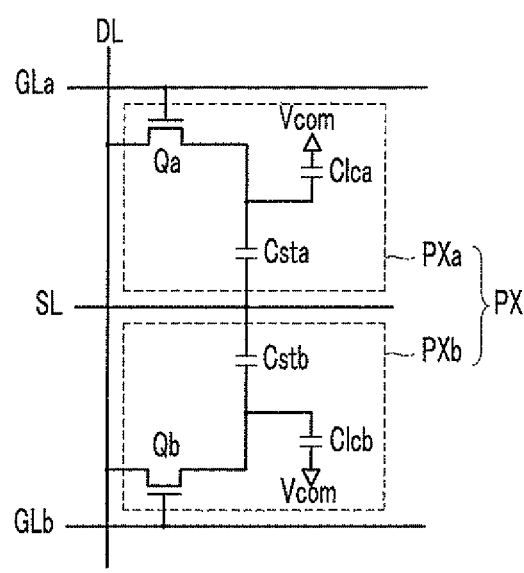
FIG. 3 is an equivalent circuit diagram of an exemplary embodiment of an LC panel assembly according to the present invention.

FIG. 3 is an exemplary embodiment of an equivalent circuit diagram of a pixel of an LC panel assembly according to the present invention.

Referring to FIG. 3, an LCD panel assembly includes signal lines including a plurality of pairs of gate lines GLa and GLb, a plurality of data lines DL, a plurality of storage electrode lines SL and a plurality of pixels PX connected to the signal lines.

Each pixel PX includes a pair of sub-pixels PXa and PXb. Each sub-pa corresponding gate line GLa/GLb and a data line DL, an LC capacitor Clca/Clcb connected to the switching element Qa/Qb, and a storage capacitor Csta/Cstb connected to the switching element Qa/Qb and the storage electrode line SL.

In the illustrated embodiment, each switching element Qa/Qb including a thin film transistor ("TFT"), is a three-terminal element provided on the lower panel 100. The switching element Qa/Qb has a control terminal connected to a gate line GLa/GLb, an input terminal connected to a data line DL, and an output terminal connected to an LC capacitor Clca/Clcb and a storage capacitor Csta/Cstb.

The storage capacitor Csta/Cstb, functioning as an auxiliary capacitor for the LC capacitor Clca/Clcb, is formed by overlapping a storage electrode line SL provided on the lower panel 100 with a sub-pixel electrode PEa/PEb via an insulator disposed therebetween. The storage electrode line SL is supplied with a predetermined voltage such as the common voltage Vcom. Alternatively, the storage capacitors Csta and Cstb may be formed by overlapping of the sub-pixel electrodes PEa and PEb with a previous gate line right above (e.g., adjacent to) them via an insulator.

A detailed description of the LC capacitors Clca and Clcb, which were described above, will be omitted for brevity.

In an LCD including the illustrated embodiment of the LC panel assembly, the signal controller 600 may receive input image signals R, G, and B for a pixel PX and convert them into output image signals DAT for two sub-pixels PXa and PXb. The output image signals DAT are transmitted to the data driver 500. Separate sets of gray voltages for the two sub-pixels PXa and PXb may be generated by the gray voltage generator 800, the sets of gray voltages being alternately applied to the data driver 500 or alternately selected by the data driver 500, thereby applying different voltages to the two sub-pixels PXa and PXb.

In exemplary embodiments, the image signals are compensated or sets of gray voltages are generated such that the synthesized gamma curve of the two sub-pixels PXa and PXb is close to the reference gamma curve at front view. In one exemplary embodiment, the synthesized gamma curve at front view is made to accord with the reference gamma curve at front view which is determined to be the most appropriate for the LC panel assembly, and the lateral synthesized gamma curve is made to be most similar to the reference gamma curve at front view.

An exemplary embodiment of the LC panel assembly illustrated in FIG. 3 will be described in detail with reference to FIG. 4 to FIG. 6 along with FIG. 3 described above.

Figure 4:
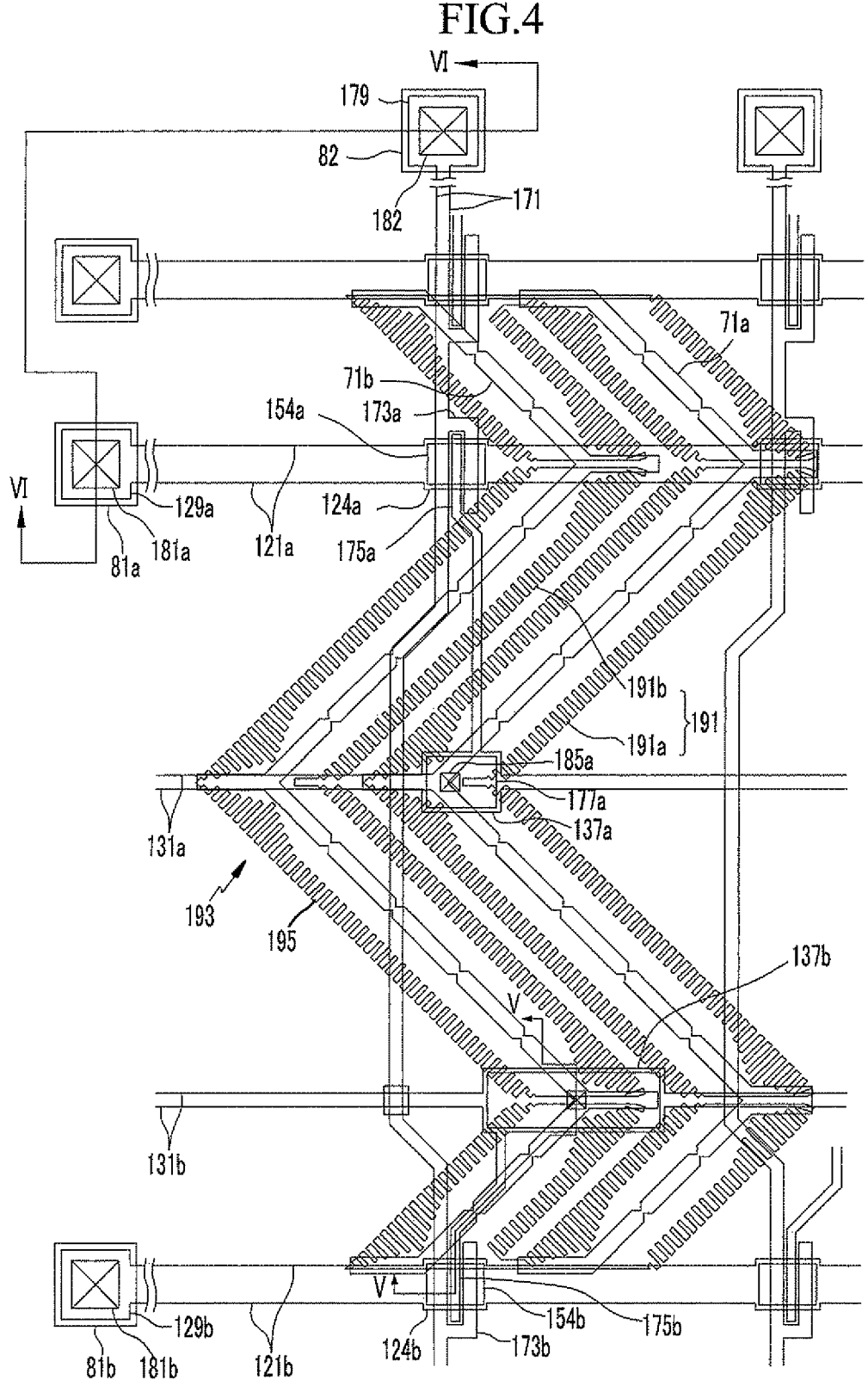
FIG. 4 is a layout view of an exemplary embodiment of an LC panel assembly according to the present invention.
Figure 5:
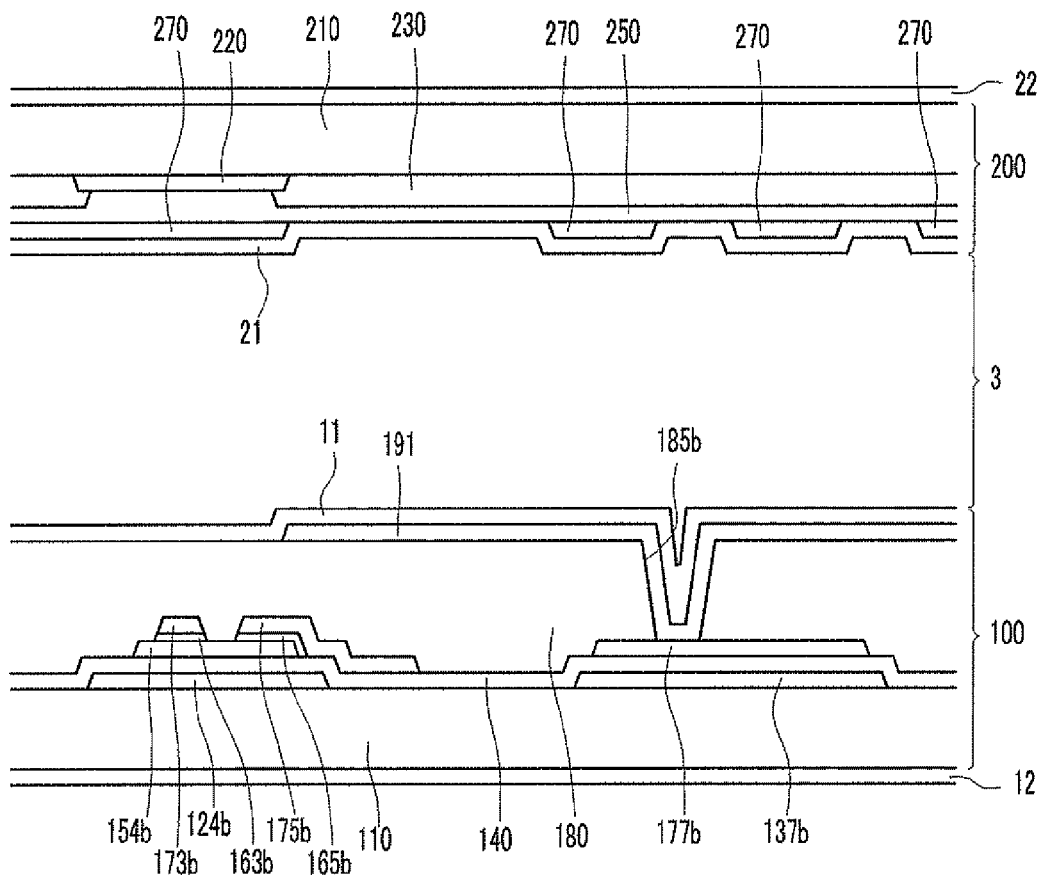
FIG. 5 and FIG. 6 are cross-sectional views of the LC panel assembly illustrated in FIG. 4 taken along line V-V and line VI-VI, respectively.
Figure 6:
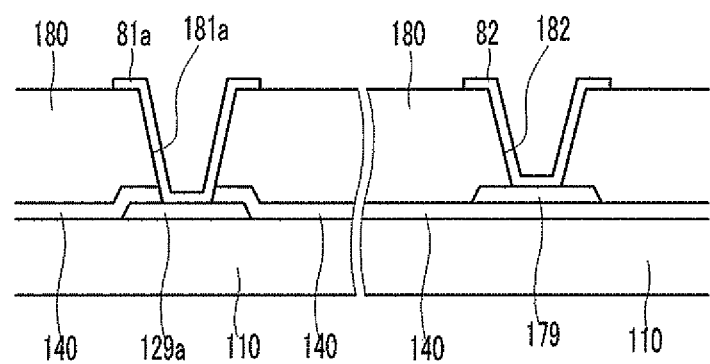

FIG. 4 is an exemplary embodiment of a layout view of an LC panel assembly according to the present invention, and FIG. 5 and FIG. 6 are exemplary embodiments of cross-sectional views of the LC panel assembly illustrated in FIG. 4 taken along line V-V and line VI-VI, respectively.

Referring to FIG. 4 and FIG. 5, the LC panel assembly includes a lower panel 100 and an upper panel 200 opposing each other with an LC layer 3 interposed between the two panels 100 and 200.

First, the lower panel 100 will be described in detail.

A plurality of gate conductors including a plurality of pairs of first and second gate lines 121a and 121b and a plurality of pairs of first and second storage electrode lines 131a and 131b are formed on an insulating substrate 110. The substrate 100 may be made of transparent glass or plastic.

The first and second gate lines 121a and 121b for transmitting gate signals extend substantially in a transverse direction and are disposed in an upper position and a lower position, respectively.

Each of the first gate lines 121a includes a plurality of first gate electrodes 124a protruding upward and an end portion 129a having a relatively large area for connection with another layer or the gate driver 400. Each of the second gate lines 121b includes a plurality of second gate electrodes 124b protruding downward and an end portion 129b having a relatively large area for connection with another layer or the gate driver 400. In exemplary embodiments when the gate driver 400 is integrated into the substrate 110, the gate lines 121a and 121b may be extended to be directly connected to the gate driver 400.

The storage electrode lines 131a and 131b supplied with a predetermined voltage such as a common voltage Vcom extend substantially in the transverse direction. The first and second storage electrode lines 131a and 131b are disposed between the first gate line 121a and the second gate line 121b.

Each storage electrode line 131a and 131b includes a plurality of pairs of first and second storage electrodes 137a and 137b extending downward and upward, respectively. However, the shapes and arrangements of the storage electrode lines 131 including the storage electrodes 137a and 137b may be modified in various ways.

In exemplary embodiments, the gate conductors 121a, 121b, 131a and 131b may be made of an aluminum (Al) containing metal such as Al and an Al alloy, a silver (Ag) containing metal such as Ag and a Ag alloy, a copper (Cu) containing metal such as Cu and a Cu alloy, a molybdenum (Mo) containing metal such as Mo and a Mo alloy, chromium (Cr), tantalum (Ta), and titanium (Ti). Alternatively, the gate conductors 121a, 121b, 131a, and 131b may have a multi-layered structure including two conductive layers (not shown) having different physical properties. In one exemplary embodiment, one of the two conductive layers may be made of a low resistivity metal such as an Al-containing metal, an Ag-containing metal, or a Cu-containing metal for reducing signal delay or voltage drop. The other conductive layer may be made of a material such as a Mo-containing metal, Cr, Ti, and Ta, which has good physical, chemical, and electrical contact characteristics with other materials such as indium tin oxide ("ITO") or indium zinc oxide ("IZO"). Exemplary embodiments of the combination of two layers include, but are not limited to, a pair of a lower Cr layer and an upper Al (alloy) layer and a pair of a lower Al (alloy) layer and an upper Mo (alloy) layer. However, the gate conductors 121a, 121b, 131a, and 131b may be made of many various metals or conductors besides the above.

Lateral sides of the gate conductors 121a, 121b, 131a and/or 131b may be inclined relative to an upper (e.g., horizontal) surface of the substrate 110. An inclination angle of the gate conductors 121a, 121b, 131a and/or 131b may range from about 30 degrees to about 80 degrees.

A gate insulating layer 140 is formed on the gate conductors 121a, 121b, 131a and 131b. The gate insulating layer 140 may be made of silicon nitride (SiNx) or silicon oxide (SiOx)

A plurality of first and second semiconductor islands 154a and 154b are formed on the gate insulating layer 140. The first and the second semiconductors 154a and 154b are disposed on the first and second gate electrodes 124a and 124b, respectively. The first and second semiconductor islands 154a and 154b may be made of hydrogenated amorphous silicon (abbreviated to "a-Si") or polysilicon.

A pair of ohmic contact islands 163b and 165b are formed on each of the first semiconductor islands 154a, and a pair of ohmic contact islands (not shown) is also formed on each of the second semiconductor islands 154b. The ohmic contacts 163b and 165b may be made of n+ hydrogenated a-Si heavily doped with an n-type impurity such as phosphorus (P), or of silicide.

Lateral sides of the semiconductors 154a and 154b and the ohmic contacts 163b and 165b may be inclined relative to the upper surface of the substrate 110. Inclination angle of the lateral sides of the semiconductors 154a and 154b and the ohmic contacts 163b and 165b may range from about 30 degrees to about 80 degrees.

A plurality of data conductors including a plurality of data lines 171 and a plurality of pairs of first and second drain electrodes 175a and 175b are formed on the ohmic contacts 163b and 165b and the gate insulating layer 140.

The data lines 171 transmitting data signals extend substantially in a longitudinal direction and intersect the gate lines 121a and 121b and the storage electrode lines 131a and 131b. As illustrated in FIG. 4, each data line 171 is not a straight line over all and it is curved (e.g., bends) at least twice.

Each data line 171 includes a plurality of pairs of first and second source electrodes 173a and 173b branched out toward the first and second gate electrodes 124a and 124b, respectively. An end portion 179 of data line 171 has a relatively large area for connection with another layer or the data driver 500. When the data driver 500 is integrated into the substrate 110, the data lines 171 may be extended to be directly connected to it.

The first and second drain electrodes 175a and 175b are separated from each other and also separated from the data lines 171.

The first/second drain electrode 175a/175b opposes the first/second source electrode 173a/173b with respect to the first/second gate electrode 124a/124b and includes an end portion 177a/177b having a large area and a stick-shaped end portion. The end portions 177a and 177b having a relatively large area overlapping the first and second storage electrodes 137a and 137b, respectively. the stick-shaped end portions 177a and 177b are partially surrounded by the first and second curved source electrodes 173a and 173b.

The first/second gate electrode 124a/124b, the first/second source electrode 173a/173b, and the first/second drain electrode 175a/175b, along with the first/second semiconductor 154a/154b, form the first/second TFT Qa/Qb. The first/second TFT Qa/Qb includes a channel formed in the first/second semiconductor 154a/154b disposed between the first/second source electrode 173a/173b and the first/second drain electrode 175a/175b.

In an exemplary embodiment, the data conductors 171, 175a, and 175b may be made of a refractory metal such as Mo, Cr, Ta, and Ti or an alloy thereof. The data line 171 and the drain electrode 175 may have a multi-layered structure including a refractory metal layer (not shown) and a conductive layer (not shown) having low resistivity. One exemplary embodiment of the multi-layered structure includes double layers of a lower Cr or Mo (alloy) layer and an upper Al (alloy) layer, and triple layers of a lower Mo (alloy) layer, an intermediate Al (alloy) layer, and an upper Mo (alloy) layer. However, the data conductors 171, 175a and 175b may be made of many various metals or conductive materials besides the above.

Lateral sides of the data conductors 171, 175a, and 175b may be inclined relative to the upper surface of the substrate 110. Inclination angles of the lateral sides of the data conductors 171, 175a, and 175b may range from about 30 degrees to about 80 degrees.

The ohmic contacts 163b and 165b are interposed only between the underlying semiconductors 154a and 154b and the overlying data conductors 171, 175a, and 175b and reduce the contact resistance therebetween. The semiconductors 154a and 154b include exposed portions that are not covered with the data conductors 171, 175a, and 175b, such as portions located between the source electrodes 173a and 173b and the drain electrodes 175a and 175b.

A passivation layer 180 is formed on the data conductors 171, 175a, 175b and the exposed portions of the semiconductors 154a and 154b. The passivation layer 180 may be made of an inorganic insulator or an organic insulator. An upper surface of the passivation layer 180 may be substantially flat (e.g., parallel to the upper surface of the substrate 110).

In exemplary embodiments, the organic insulator may have photosensitivity and/or a dielectric constant of less than about 4.0. Alternatively, the passivation layer 180 may have a double-layered structure including a lower inorganic layer and an upper organic layer in order not to harm the exposed portions of the semiconductors 154a and 154b and to make the most of the favorable insulating characteristics of the organic layer.

The passivation layer 180 has a plurality of contact holes 182, 185a, and 185b respectively exposing the end portions 179 of the data lines 171 and the large end portions 177a and 177b of the first and second drain electrodes 175a and 175b. The passivation layer 180 and the gate insulating layer 140 have a plurality of contact holes 181a and 181b respectively exposing the end portions 129a and 129b of the gate lines 121a and 121b.

A plurality of pixel electrodes 191 and a plurality of contact assistants 81a, 81b, and 82 are formed on the passivation layer 180. The contact assistants 81a, 81b, and 82 may be made of a transparent conductor such as ITO or IZO, or a reflective metal such as Al, Ag, Cr, or an alloy thereof.

Each pixel electrode 191 includes a pair of first and second sub-pixel electrodes 191a and 191b that are separated from each other.

Each of the first sub-pixel electrodes 191a is connected to a respective first drain electrode 175a through the contact hole 185a, and each of the second sub-pixel electrodes 191b is connected to a respective second drain electrode 175b through the contact hole 185b.

The pixel electrodes 191 overlap the data lines 171 with the passivation layer 180 interposed therebetween. Each data line 171 overlaps every adjacent pair of pixel electrodes 191. The data line 171 is curved or bent several times rather than being in a substantially straight longitudinal line in order to overlap both of a self pixel electrode 191 connected to the data line 171 through the first TFT and an adjacent pixel electrode 191 which is adjacent to the self pixel electrode 191.

A detailed structure of an exemplary embodiment of a pixel electrode of the LC panel assembly will now be described in detail with reference to FIG. 7, FIG. 8A, FIG. 8B, FIG. 8C, FIG. 9, FIG. 10, and FIG. 11.

Figure 7:
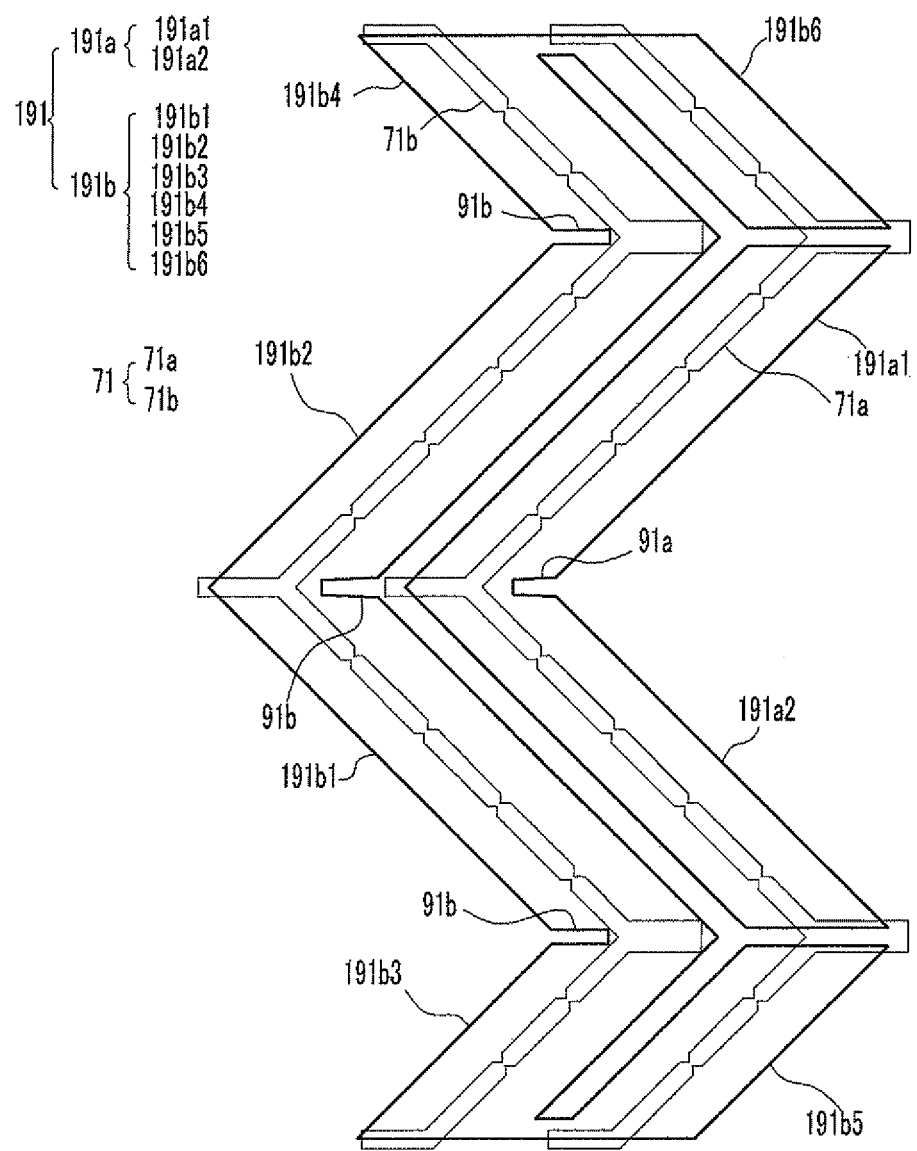
FIG. 7 is a layout view of an exemplary embodiment of a pixel electrode and a common electrode of an LC panel assembly according to the present invention.
Figure 8A:
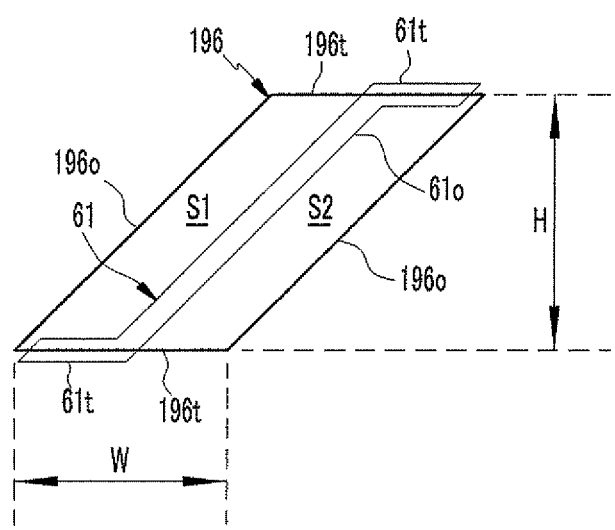
FIG. 8A to FIG. 8C are top plane views of an exemplary embodiment of an electrode piece which is a base unit of each sub-pixel electrode illustrated in FIG. 7.
Figure 8B:
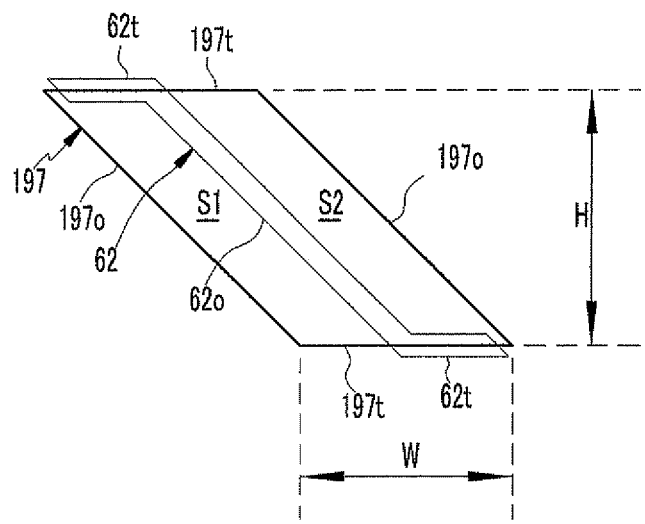
Figure 8C:
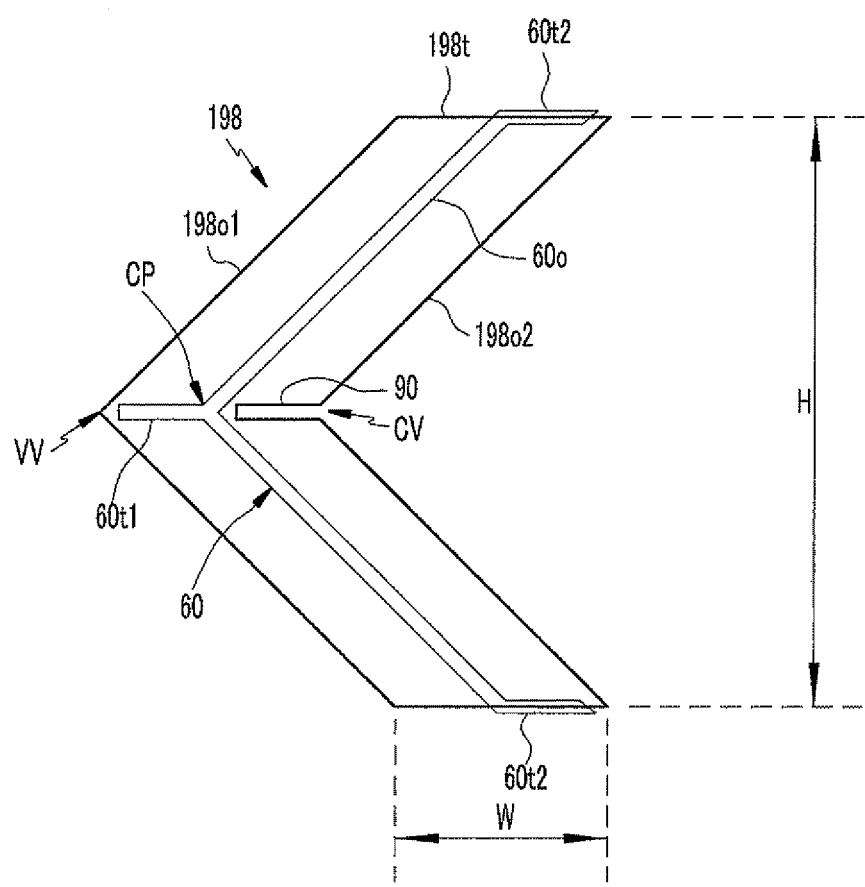
Figure 9:
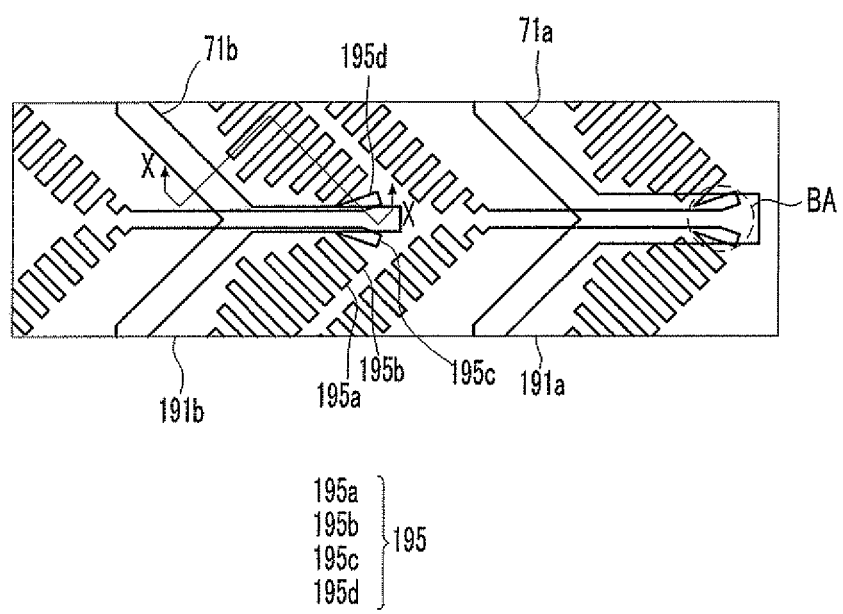
FIG. 9 is a top plane view illustrating an exemplary embodiment of a portion of the LC panel assembly shown in FIG. 4.
Figure 10:
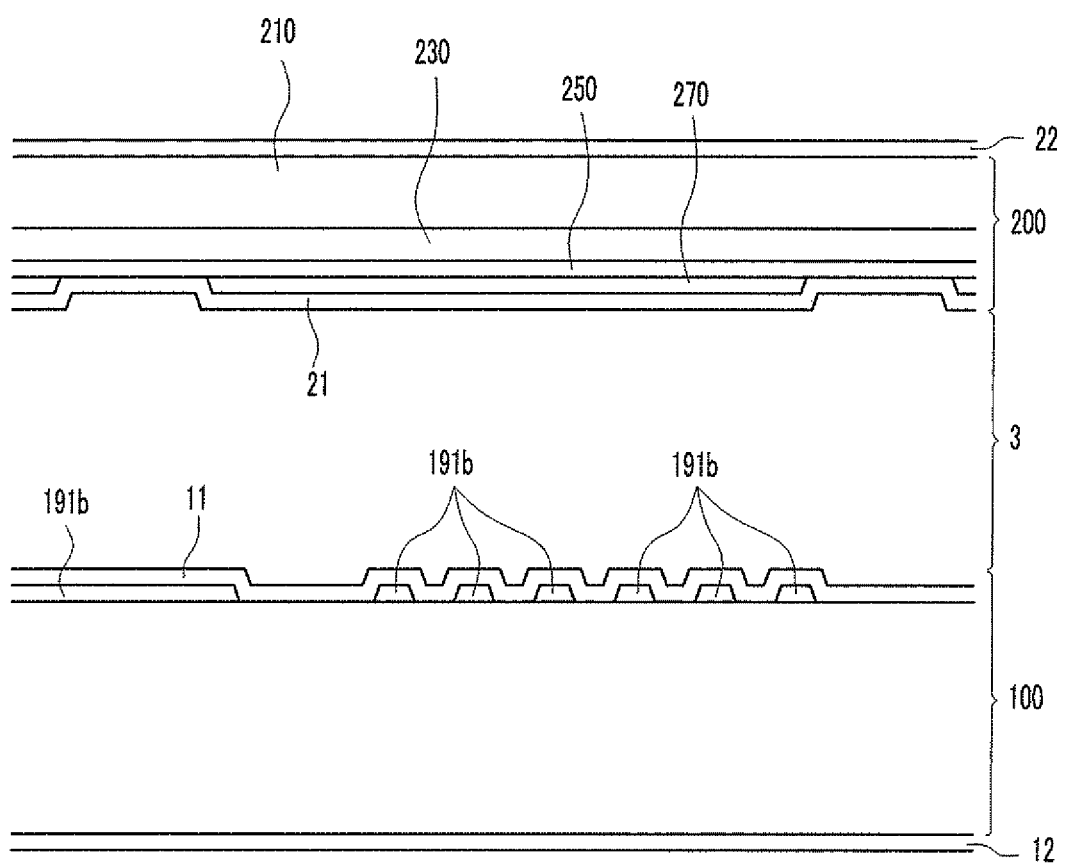
FIG. 10 is a cross-sectional view roughly illustrating the LC panel assembly shown in FIG. 9 taken along the line X-X.
Figure 11:
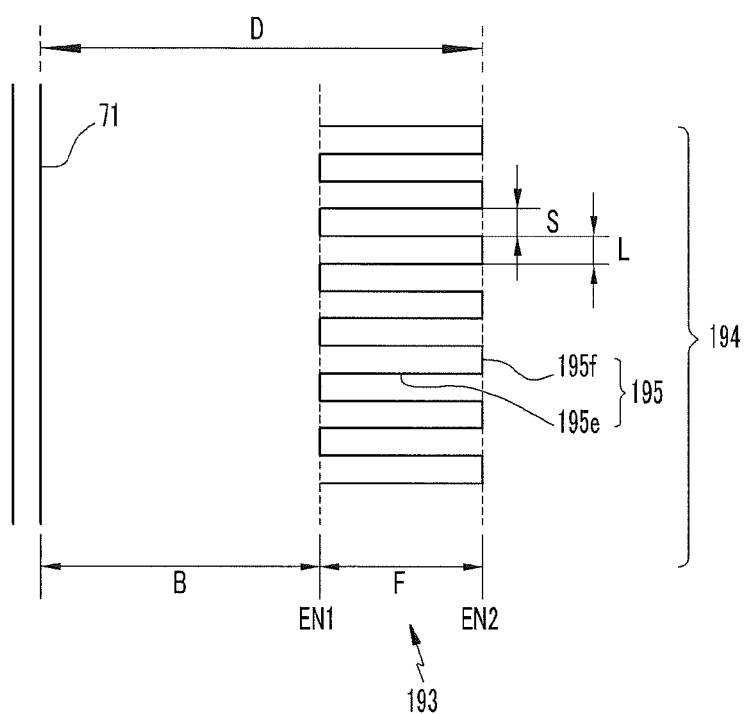
FIG. 11 is a top plane view illustrating an exemplary embodiment of a portion of a pixel electrode of an LCD according to the present invention.

FIG. 7 is a rough layout view of an exemplary embodiment of a pixel electrode and a common electrode of an LC panel assembly according to the present invention, FIG. 8A to FIG. 8C are top plane views of an exemplary embodiment of an electrode piece that is a base unit of each sub-pixel electrode illustrated in FIG. 7, FIG. 9 is a top plane view illustrating an exemplary embodiment of a portion of the LC panel assembly shown in FIG. 4, FIG. 10 is a cross-sectional view roughly illustrating the LC panel assembly shown in FIG. 9 taken along line X-X and FIG. 11 is a top plane view illustrating an exemplary embodiment of a portion of a pixel electrode of an LCD according to the present invention.

As shown in FIG. 7, each pixel electrode 191 of an LC panel assembly includes a pair of first and second sub-pixel electrodes 191a and 191b that are separated from each other. The first sub-pixel electrode 191a and the second sub-pixel electrode 191b are adjacent to each other in the row (e.g., transverse) direction, and include cutouts 91a and 91b. The common electrode (270, refer to FIGS. 2 and 5) includes cutouts 71a and 71b opposing (e.g., facing) the first and second sub-pixel electrodes 191a and 191b. As shown in FIG. 4 and FIG. 9, a plurality of protruded and depressed portions 193 are formed around the edges of the first and second sub-pixel electrodes 191a and 191b. However, for convenience sake, the protruded and depressed portions 193 are omitted in FIG. 7 to FIG. 8C that will be described hereinafter, and will be described afterwards.

Each of the first and second sub-pixel electrodes 191a and 191b includes at least one parallelogrammic electrode piece 196 illustrated in FIG. 8A and one parallelogrammic electrode piece 197 illustrated in FIG. 8B. The electrode pieces 196 and 197 illustrated in FIG. 8A and FIG. 8B are connected to form a base electrode 198 shown in FIG. 8C. Each sub-pixel electrode 191a and 191b has a structure on based on forming the base electrode 198.

As shown in FIG. 8A and FIG. 8B, each of the electrode pieces 196 and 197 has a pair of oblique edges 196o and 197o and a pair of transverse edges 196t and 197t, and substantially has a shape of a parallelogram. Each oblique edge 196o and 197o forms an oblique angle with the transverse edges 196t and 197t. The oblique angle ranges from about 45 degrees to about 135 degrees. Hereinafter, for convenience sake, the shape of the electrode piece 196 and 197 is classified according to the direction of inclination ("inclination direction") from a perpendicular state with respect to the transverse edges 196t and 197t, and it is referred to as "right-inclined" when the inclination direction is rightward as shown in FIG. 8A and as "left-inclined" when the inclination direction is leftward as shown in FIG. 8B.

A length of the transverse edges 196t and 197t of the electrode pieces 196 and 197, e.g., a width W, and a distance between the outer transverse edges 196t and 197t, e.g., a height H, may be vary in accordance with the overall size of the LC panel assembly 300. The transverse edges 196t and 197t of each electrode piece 196 and 197 may be modified, such as curved or projected, in consideration of a relationship with other parts. Such a modification may be included when referring to a parallelogram hereinafter.

The common electrode 270 includes cutouts 61 and 62 opposing (e.g., facing) the electrode pieces 196 and 197. The electrode pieces 196 and 197 are partitioned into two sub-regions S1 and S2 with respect to the cutouts 61 and 62. The cutout 61/62 has at least one notch. The cutout 61/62 includes an oblique portion 61o/62o substantially parallel with the oblique edges 196o and 197o of the electrode pieces 196 and 197. Transverse portions of the cutout 61/62 form obtuse angles with respect to the oblique portion 61o/62o and overlap the transverse edges 196t and 197t of the electrode pieces 196 and 197, respectively.

Each sub-region S1 and S2 of the electrode pieces 196 and 197 includes two primary edges defined by the oblique portions 61o and 62o of the cutouts 61 and 62 and the oblique edges 196t and 197t of the electrode pieces 196 and 197. A distance between the primary edges taken in a direction substantially parallel to transverse edges 61t and 62t, e.g., a width of a sub-region, may be about 25 micrometers (μm) to about 40 micrometers (μm).

The base electrode 198 illustrated in FIG. 8C is formed by combining a right-inclined electrode piece 196 and a left-inclined electrode piece 197. An angle formed by the right-inclined electrode piece 196 and the left-inclined electrode piece 197 is substantially a right angle. The connection of two electrode pieces 196 and 197 is made only at a portion thereof. The portions of the electrode pieces 196 and 197 that are not connected form a cutout 90 disposed at the concavely curved side of the base electrode 198. Alternatively, the cutout 90 may be omitted.

The outer transverse edges 196t and 197t of two electrode pieces 196 and 197 form transverse edges 198t of the base electrode 198. Corresponding oblique edges 196o and 197o of two electrode pieces 196 and 197 are connected to each other to form curved edges 198o1 and 198o2 of the base electrode 198.

The curved edges 198o1 and 198o2 include a convex edge 198o1 meeting and making obtuse angles, such as about 135 degrees, with respect to the transverse edges 198t. The curved edges 198o1 and 198o2 include a concave edge 198o2 meeting and making acute angles, such as about 45 degrees, with respect to the transverse edges 198*t*. A pair of oblique edges 196*o* and 197*o* meet each other substantially at right angles to form curved edges 198*o*1 and 198*o*2 so that the curved angles thereof are substantially right angles.

The cutout 60 of the common electrode 270 extends from the concave vertex CV of the concave edge 198*o*2 toward the convex vertex VV of the convex edge 198*o*1 substantially up to a middle of the base electrode 198, (e.g., the middle taken in a transverse direction).

Cutouts 61 and 62 of the common electrode 270 are connected to each other to form a cutout 60. As illustrated in FIG. 8C, the overlapped transverse portions 61*t* and 62*t* of the cutouts 61 and 62 are combined to form a transverse portion 60*t*1. This new cutout 60 may be described as follows.

The cutout 60 includes a curved portion 60*o* having a curve point CP, a middle transverse portion 60*t*1 connected to the curve point of the curved portion 60*o*, and a pair of terminal transverse portions 60*t*2 connected to the respective ends of the curved portion 60*o*. The curved portion 60*o* of the cutout 60 has a pair of oblique portions meeting each other at a right angle. The curved portion 60*o* is substantially parallel to the curved edges 198*o*1 and 198*o*2 of the base electrode 198 and bisects the base electrode 198 into left and right halves. The middle transverse portion 60*t*1 of the cutout 60 makes an obtuse angle, such as about 135 degrees, with the curved portion 60*o* and extends substantially toward the convex vertex VV of the base electrode 198. The terminal transverse portions 60*t*2 are aligned with the transverse edges 198*t* of the base electrode 198 and make obtuse angles, such as about 135 degrees, with the curved portion 60*o*.

The base electrode 198 and the cutout 60 of the common electrode 270 substantially have inversion symmetry with respect to the imaginary straight line (hereinafter referred to as a "transverse center-line") connecting the convex vertex VV and the concave vertex CV of the base electrode 198.

In a pixel electrode 191 illustrated in FIGS. 4 and 7, the size (e.g., an area in a plane view) of the first sub-pixel electrode 191*a* is smaller than the size of the second sub-pixel electrode 191*b*. A height (e.g., taken in a longitudinal direction) of the second sub-pixel electrode 191*b* is greater than a height of the first sub-pixel electrode 191*a*. Widths (e.g., taken in a transverse direction) of the two sub-pixel electrodes 191*a* and 191*b* are substantially the same. The number of electrode pieces of the second sub-pixel electrode 191*b* is greater than the number of electrode pieces of the first sub-pixel electrode 191*b*.

Referring to FIG. 7, the first sub-pixel electrode 191*a* includes a left-inclined electrode piece 197 and a right-inclined electrode piece 196, and has substantially the same structure as the base electrode 198 illustrated in FIG. 8C.

The second sub-pixel electrode 191*b* is formed by combination of two or more left-inclined electrode pieces 197 and two or more right-inclined electrode pieces 196, and includes a base electrode 198 illustrated in FIG. 8C and left-inclined and right-inclined electrode pieces 196 and 197 combined with the base electrode 198.

The second sub-pixel electrode 191*b* illustrated in FIG. 7 includes a total of six electrode pieces 191*b*1-191*b*6, two of the electrode pieces, 191*b*5 and 191*b*6, that are disposed above and below (e.g., taken in a plane view) the first sub-pixel electrode 191*a*. The pixel electrode 191*b* has a structure that is curved three times, which is advantageous for displaying vertical lines compared to a structure that is curved once. Moreover, since the transverse portions 61*t* and 62*t* of the cutouts 61 and 62 of the common electrode 270 are combined at the place where the electrode pieces 191*a*1 and 191*a*2 of the first sub-pixel electrode 191*a* and the electrode pieces 191*b*5 and 191*b*6 of the second sub-pixel electrode 191*b* are adjacent to each other to form a transverse portion, the aperture ratio is further increased.

A height H (e.g., taken in a longitudinal direction) of the electrode pieces 191*a*1, 191*a*2, 191*b*1, and 191*b*2 disposed in the middle is different from the height of the electrode pieces 191*b*3-191*b*6 disposed above and below the electrode pieces 191*a*1, 191*a*2, 191*b*1, and 191*b*2. In one exemplary embodiment, the height of the upper and lower electrode pieces 191*b*3-191*b*6 is about half of the height of the middle electrode pieces 191*a*1, 191*a*2, 191*b*1, and 191*b*2. Accordingly, the area ratio of the first sub-pixel electrode 191*a* to the second sub-pixel electrode 191*b* becomes about 1:2. Advantageously, a desired area ratio can be obtained by regulating the height of the upper and lower electrode pieces 191*b*3-191*b*6. In exemplary embodiments, the area ratio ranges from about 1:1.1 to about 1:3.

In FIG. 7, a positional relationship and the curved direction of the first and the second sub-pixel electrodes 191*a* and 191*b* may be modified. The pixel electrode 191 in FIG. 9 may be modified through inversion symmetrical transformation up and down or right and left, or through rotational transformation.

Referring to FIG. 9 to FIG. 11, a major edge 194 of a pixel electrode 191 of an LC panel assembly includes a first envelope EN1 and a second envelope EN2. Protruded and depressed portions 193, including a plurality of protrusions 195, are formed between the first and second envelopes EN1 and EN2 of the pixel electrode 191.

Each protrusion 195 includes a first edge 195*a* connecting the first and second envelopes EN1 and EN2 and a second edge 195*b* perpendicular to the first edge 195*a*. The protrusion 195 substantially has a rectangular shape.

In FIG. 11, a length of the first edge is denoted by F and a length of the second edge 195*b* is denoted by L. The relation between the length L of the second edge 195*b* and a distance S between two neighboring (e.g., adjacent) edges of two neighboring protrusions 195 among the plurality of protrusions 195 is given by the following equation.

$$L+S \leq 2d \quad \text{(Equation 1)}$$

Here, d represents the thickness (e.g., taken substantially perpendicular to an upper surface of the lower panel, as illustrated in FIG. 10) of the LC layer 3.

The distance S between two neighboring edges of two neighboring protrusions 195 among the plurality of protrusions 195 and the length L of the second edge 195*b* may be different from each other. In exemplary embodiments, S is greater than L.

To ensure a sufficient aperture ratio of an LCD, an entire area of the protruded and depressed portions 193, that is the sum of the areas of the plurality of protrusions 195, may be less than 50% of the area of the entire pixel electrode 191.

Referring to FIG. 9, the first edges 195*a* of a plurality of protrusions 195*a* and 195*b* are parallel to each other at most places of the pixel electrode 191, while tilt directions of the protrusions 195*c* and 195*d* may be varied in the vicinity BA where the inclination directions of the parallelogrammic electrode pieces forming the pixel electrode 191 are changed. The LC molecules can be oriented naturally even in the vicinity BA of the places where the inclination directions of the parallelogrammic electrode pieces forming the pixel electrode 191 are changed.

The ratio between the distance S between two neighboring edges of two neighboring protrusions 195 among the plurality of protrusions 195, and the length L of the second edge 195*b* may be varied depending on the position of a pixel electrode 191. That is, protruded and depressed portions 193 formed in two electrode pieces having different inclination directions from each other among the parallelogrammic electrode pieces forming a pixel electrode 191 may have different L/S values from each other. Advantageously, bad formation of patterns due to a possible error occurring during an exposure can be reduced or effectively prevented.

Even though protruded and depressed portions 193 are formed in both of the first and second sub-pixel electrodes 191*a* and 191*b* as illustrated in FIG. 4 and FIG. 9, the protruded and depressed portions 193 may be formed in only one of the first sub-pixel electrode 191*a* and the second sub-pixel electrode 191*b*. Advantageously, the protruded and depressed portions 193 may be formed in any one of the sub-pixel electrodes, thereby ensuring relatively high transmittance.

Referring to FIG. 4 to FIG. 6 again, the first/second sub-pixel electrode 191*a*/191*b* and the common electrode 270 provided on the upper panel 200 along with the LC layer 3 disposed therebetween form a first/second LC capacitor Clca/Clcb respectively to store applied voltages even after the TFT Qa/Qb is turned off.

A first/second sub-pixel electrode 191*a*/191*b* and a first/second drain electrode 175*a*/175*b* connected thereto overlap a storage electrode 137*a*/137*b* via the gate insulating layer 140 interposed therebetween to form a first/second storage capacitor Csta/Cstb, respectively, and the first/second storage capacitor Csta/Cstb enhances the voltage storing capacity of the first/second LC capacitor Clca/Clcb.

The contact assistants 81*a*, 81*b*, and 82 are connected to the end portions 129*a* and 129*b* of the gate lines 121*a* and 121*b* and the end portion 179 of the data line 171 through the contact holes 181*a*, 181*b*, and 182, respectively. The contact assistants 81*a*, 81*b*, and 82 supplement adhesion of the end portions 129*a* and 129*b* of the gate lines 121*a* and 121*b* and the end portions 179 of the data lines 171 to exterior devices, and protect them.

Next, the description of the upper panel 200 follows.

Referring to FIGS. 2, 5 and 10, a light blocking member 220 is formed on an insulating substrate 210. The insulating substrate 210 may be made of transparent glass or plastic. The light blocking member 220 includes curved portions facing the curved edges of the pixel electrodes 191 and quadrilateral portions facing the TFTs. The light blocking member 220 defines opening areas opposed to the pixel electrodes 191 and also reduces or effectively prevents the leakage of light between the pixel electrodes 191.

A plurality of color filters 230 are also formed on the substrate 210 and the light blocking member 220. The color filters 230 are disposed substantially in the areas enclosed by the light blocking member 220 and may extend in a longitudinal direction substantially along the pixel electrodes 191. Each of the color filters 230 may represent one of the primary colors such as red, green, and blue colors.

An overcoat 250 is formed on the color filters 230 and the light blocking member 200. In an exemplary embodiment, the overcoat 250 may be made of an (organic) insulator. The overcoat layer reduces or effectively prevents the color filters 230 from being exposed and also provides a substantially flat (e.g., upper and lower) surface. In an alternative embodiment, the overcoat 250 may be omitted.

The common electrode 270 is formed on the overcoat 250.

Alignment layers 11 and 21 are coated on inner surfaces of the panels 100 and 200. The alignment layers may be homeotropic.

Polarizers 12 and 22 are provided on outer surfaces of the panels 100 and 200. Polarization axes of the polarizers 11 and 22 may be perpendicular to each other, and one of the polarization axes is preferably parallel to the gate lines 121*a* and 121*b*. In an alternative embodiment, one of the polarizers 12 and 22 may be omitted when the LCD is a reflective LCD.

The LCD may include a backlight unit (not shown) for supplying light to the polarizers 12 and 22, a retardation film (not shown), the panels 100 and 200, and the LC layer 3.

The LC layer 3 is in a state of negative dielectric anisotropy and the LC molecules in the LC layer 3 are aligned such that their long axes are substantially vertical to the surfaces of the panels 100 and 200 in the absence of an electric field.

Now, the operation of the LCD will be described in detail.

Referring again to FIG. 1, the signal controller 600 is supplied with input image signals R, G, and B and input control signals for controlling the display thereof from an external graphics controller (not shown). The input image signals R, G, and B include luminance information of each pixel PX, and the luminance has a predetermined number of, such as, 1024 ($=2^{10}$), 256 ($=2^{8}$), or 64 ($=2^{6}$) grays. The input control signals include, but are not limited to, a vertical synchronization signal Vsync, a horizontal synchronization signal Hsync, a main clock signal MCLK, and a data enable signal DE.

On the basis of the input control signals and the input image signals R, G, and B, the signal controller 600 processes the input image signals R, G, and B to be suitable for the operating condition of the LC panel assembly 300 and the data driver 500, and generates gate control signals CONT1 and data control signals CONT2. Then, the signal controller 600 transmits the gate control signals CONT1 to the gate driver 400 and transmits the processed image signals DAT and the data control signals CONT2 to the data driver 500. The output image signals DAT are digital signals having a predetermined number of values (or grays).

The gate control signals CONTI may include a scanning start signal STV for instructing to start scanning and at least one clock signal for controlling the output time of the gate-on voltage Von. The gate control signals CONT1 may further include an output enable signal OE for defining the duration of the gate-on voltage Von.

The data control signals CONT2 may include a horizontal synchronization start signal STH for informing a start of image data transmission for a packet of sub-pixels, a load signal LOAD for instructing to apply the data signals to the LC panel assembly 300, and a data clock signal HCLK. The data control signal CONT2 may further include an inversion signal RVS for reversing the polarity of the data signals with respect to the common voltage Vcom (hereinafter, "polarity of the data signals with respect to the common voltage Vcom" is referred to as "polarity of the data signals").

In response to the data control signals CONT2 from the signal controller 600, the data driver 500 sequentially receives the digital image signals DAT for the packet of sub-pixels, selects gray voltages corresponding to the respective digital image signals DAT, converts the digital image signals DAT into analog data signals, and applies the analog data signals to the corresponding data lines.

The gate driver 400 applies the gate-on voltage Von to the gate lines in response to the gate control signals CONT1 from the signal controller 600, thereby turning on the switching elements connected to the gate lines. Then, data signals applied to the data lines are applied to the corresponding sub-pixels through the turned-on switching elements.

Here, the first sub-pixel electrode 191*a* and the second sub-pixel electrode 191*b* forming a pixel electrode 191 are connected to different switching elements from each other, and the two sub-pixels are supplied with different data voltages through the same data line at a different time from each other. Alternatively, the first sub-pixel electrode 191a and the second sub-pixel electrode 191b are connected to different switching elements from each other, and the two sub-pixels may be supplied with different data voltages through different data lines from each other at the same time. Alternatively, when the first sub-pixel electrode 191a is connected to a switching element (not shown) and the second sub-pixel electrode 191b is capacitively coupled to the first sub-pixel electrode 191a, only the sub-pixel including the first sub-pixel electrode 191a is supplied with data voltages through the switching element, and the sub-pixel including the second sub-pixel electrode 191b is supplied with voltages depending on the voltages of the first sub-pixel electrode 191a. Here, the voltage of the first sub-pixel electrode 191a having a relatively small area is higher than the voltage of the second sub-pixel electrode 191b having a relatively large area.

As in the illustrated embodiment, when a potential difference is generated across the first or second LC capacitor Clc1 or Clc2, a primary electric field that is substantially perpendicular to the surfaces of the panels 100 and 200 is generated in the LC layer 3. Hereinafter, the pixel electrode 191 and the common electrode 270 are jointly referred to as "field generating electrodes". Then, the LC molecules in the LC layer 3 tilt in response to the electric field such that their long axes become perpendicular to the electric field direction, and the degree of the tilt of the LC molecules determines the change of the polarization of incident light onto the LC layer 3. This change of the light polarization causes a change of light transmittance through the polarizers, and in this way, the LCD displays images.

The tilt angle of the LC molecules depends on the strength of the electric field. Since the voltages of the two LC capacitors Clca and Clcb are different from each other, the tilt angles of the LC molecules are also different from each other and thus the luminances of the two sub-pixels are different from each other. Therefore, the voltage of the first LC capacitor Clca and the voltage of the second LC capacitor Clcb can be adjusted so that an image viewed from a lateral side is most similar to an image viewed from the front, that is, the lateral gamma curve can be made to be most similar to the gamma curve at the front, thereby improving the lateral visibility.

Also, when the area of the first sub-pixel electrode 191a supplied with a higher voltage is formed to be smaller than the area of the second sub-pixel electrode 191b, the lateral gamma curve can be more similar to the gamma curve at the front. In an exemplary embodiment, when the area ratio of the first to the second sub-pixel electrodes 191a and 191b is approximately 1:2 to 1:3, the lateral gamma curve is much more similar to the gamma curve at the front, thereby further improving the lateral visibility.

The edges of the sub-pixel electrodes 191a and 191b and the cutouts 71a and 71b of the electric field-generating electrodes 191 and 270 distort the primary electric field and give it a horizontal component, which initially determines the tilt directions of the LC molecules. The horizontal component of the primary electric field are perpendicular to the edges of the sub-pixel electrodes 191a and 191b and the edges of the cutouts 71a and 71b.

Referring again to FIG. 7, since the LC molecules on each sub-region divided by the cutouts 71a and 71b substantially tilt vertically to the primary edges, the azimuthal distribution of the tilt directions is localized to four directions. In this way, when tilt directions of the LC molecules are various, the reference viewing angle of the LCD is increased.

Meanwhile, the direction of a secondary electric field that is secondarily generated due to the voltage difference between the sub-pixel electrodes 191a and 191b is perpendicular to each of the primary edges of the sub-regions. Accordingly, the direction of the secondary electric field coincides with that of the horizontal component of the primary electric field. Consequently, the secondary electric field between the sub-pixel electrodes 191a and 191b enhances the determination of the tilt directions of the LC molecules.

The further a distance between the cutouts 71a and 71b of the common electrode 270 and the major edges 194 of the pixel electrode 191 is, the more the transmittance of the LCD is ensured, while the LC molecules located relatively far from the cutouts 71a and 71b or the major edges 194 are hardly affected by the electric field. Advantageously, the motion of the LC molecules responding to the electric field is slowed, and the response speed of the LCD is decreased.

If protruded and depressed portions 193 are formed at the edges of the pixel electrode 191 as in the illustrated exemplary embodiments, the distance between the first envelope EN1 and the cutout 71 of the common electrode 270 becomes relatively short. Therefore, the LC molecules located between the first envelope EN1 and the cutout 71 of the common electrode can be relatively 6 easily affected by the electric field generated by the cutout 71 or the major edge 194. Accordingly, the motion of the LC molecules becomes fast, and the response speed is improved. As a distance between the second envelope EN2 and the cutout 71 of the common electrode is relatively far so as to not contribute to the response speed, the far distance may ensure the area of the pixel electrode 191.

Advantageously, as in the illustrated embodiments, the transmittance of the LCD can be sufficiently ensured while improving the response speed.

By repeating this procedure by a unit of the horizontal period (which is also denoted as "1H" and is equal to one period of the horizontal synchronization signal Hsync and the data enable signal DE), all pixels PX are supplied with data signals, thereby displaying an image for a frame.

When the next frame starts after one frame is finished, the inversion signal RVS applied to the data driver 500 is controlled such that the polarity of the data signals applied to each pixel PX is reversed to be opposite to the polarity in the previous frame (which is referred to as "frame inversion"). Here, even during one frame, the polarity of the data signal flowing in a data line may vary in accordance with the characteristics of the inversion signal RVS (for example row inversion and dot inversion), or the polarities of the data signals applied to a packet of pixels may be different from each other (for example column inversion and dot inversion).

Now, effects of an exemplary embodiment of an LCD according to the present invention will be described in detail with reference to FIG. 12 to FIG. 19B.

Figure 13:
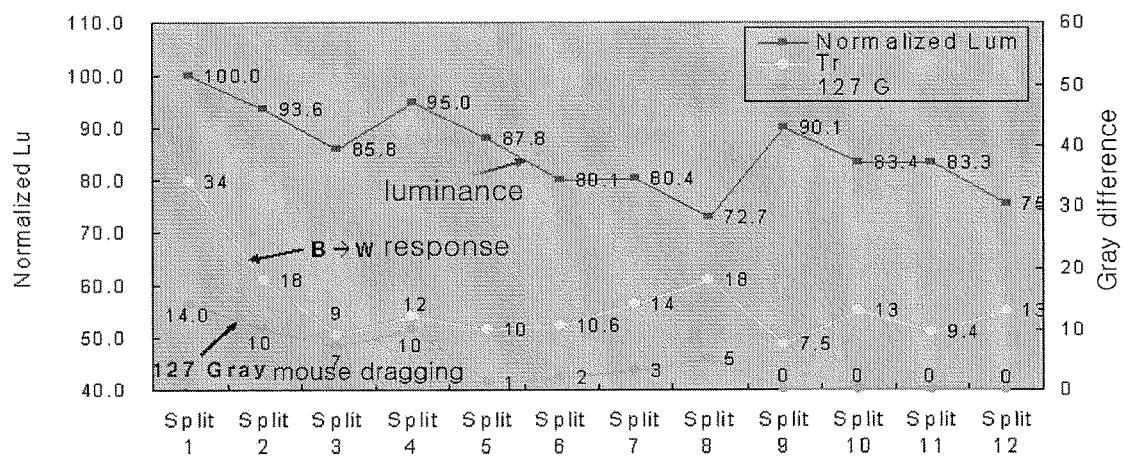
FIG. 13 is a graph illustrating examined luminance, response time, and mouse dragging of exemplary embodiments of LCDs described in FIG. 12 according to the present invention.

FIG. 12 is a table describing characteristics of LCDs according to various exemplary embodiments of the present invention, and FIG. 13 is a graph illustrating examined luminance, response time, and mouse dragging of LCDs according to the various exemplary embodiments described in FIG. 12.

In exemplary embodiment 1, exemplary embodiment 4, and exemplary embodiment 7, protruded and depressed portions are not formed in the pixel electrode 191, and the distance D between the cutout 71 of the common electrode 270 and the edge of the pixel electrode 191 is changed. That is, D is 33 um, 30 um, and 27 um in exemplary embodiment 1, exemplary embodiment 4, and exemplary embodiment 7, respectively.

In exemplary embodiment 2, exemplary embodiment 3, exemplary embodiment 5, exemplary embodiment 6, exemplary embodiment 8, exemplary embodiment 9, exemplary embodiment 11, and exemplary embodiment 12, protruded and depressed portions were formed in the pixel electrode 191 with various conditions. In exemplary embodiment 2, exemplary embodiment 3, exemplary embodiment 5, and exemplary embodiment 6, the distance S between neighboring edges of neighboring protrusions 195 is 4 um, respectively, and in the exemplary embodiment 8, exemplary embodiment 9, exemplary embodiment 11, and exemplary embodiment 12, the distance L between neighboring edges of neighboring protrusions 195 is 5 um, respectively.

In exemplary embodiment 2, exemplary embodiment 6, exemplary embodiment 8, and exemplary embodiment 11, the ratio of the length L of the second edge 195b of the protrusion 195 to the distance S between neighboring edges of two neighboring protrusions 195 is 1.5:1, in exemplary embodiment 3, exemplary embodiment 9, and exemplary embodiment 12, the ratio is 1:1, and in exemplary embodiment 5, the ratio is 2:1.

In exemplary embodiment 2, exemplary embodiment 3, exemplary embodiment 5, exemplary embodiment 8, and exemplary embodiment 9, the ratio of the length F of the first edge 195a of the protrusion 195 to a distance B between the cutout 71 of the common electrode 270 and the first envelope EN1 is 1:1, and in the exemplary embodiment 6, exemplary embodiment 11, and exemplary embodiment 12 the ratio is 1:0.3.

In addition, in exemplary embodiment 5, the shape of the protrusion is triangular, and in the rest of the exemplary embodiments, the shape of the protrusion is rectangular.

In exemplary embodiment 10, protruded and depressed portions 193 are not formed in the first sub-pixel electrode 191a, with D of 33 um, and protruded and depressed portions are formed in the second sub-pixel electrode 191b.

Referring to FIG. 13, luminance, response time when black changes into white, and mouse dragging at 127 gray were examined in exemplary embodiment 1 to exemplary embodiment 12. When the luminance of exemplary embodiment 1 is seen as 100%, each exemplary embodiment shows 75% to 90% of transmittance depending on the respective conditions.

Examining exemplary embodiment 9 to exemplary embodiment 12, the mouse dragging appears to be 0 millisecond (ms), so the problem of a mouse dragging phenomenon was completely solved.

Now, transmittances according to various conditions will be described with reference to FIG. 14 to FIG. 17.

FIG. 14 to FIG. 17 are graphs illustrating transmittances according to exemplary embodiments of the present invention.

Figure 14:
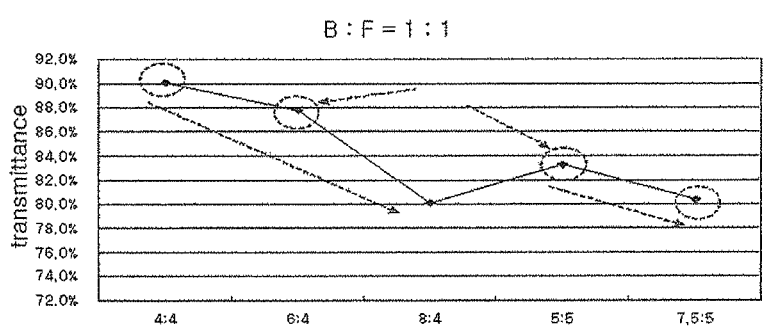
FIG. 14 to FIG. 17 are graphs illustrating transmittances examined according to various conditions of exemplary embodiments of an LCD according to the present invention.

Referring to FIG. 14, transmittances were examined while the distance S between two neighboring edges of two neighboring protrusions 195 and the length L of the second edge 195b were varied as 4 um:4 um, 6 um:4 um, 8 um:4 um, 5 um:5 um, and 7 um:5.5 um. Here, the ratio of the length F of the first edge 195a of the protrusion 195 to the distance B between the cutout 71 of the common electrode 270 and the first envelope EN1 was kept at 1:1. If the summed length of L and S is referred to as a pitch of the protruded and depressed portions 193, it can be known that as the pitch increases, the transmittance decreases.

Figure 15:
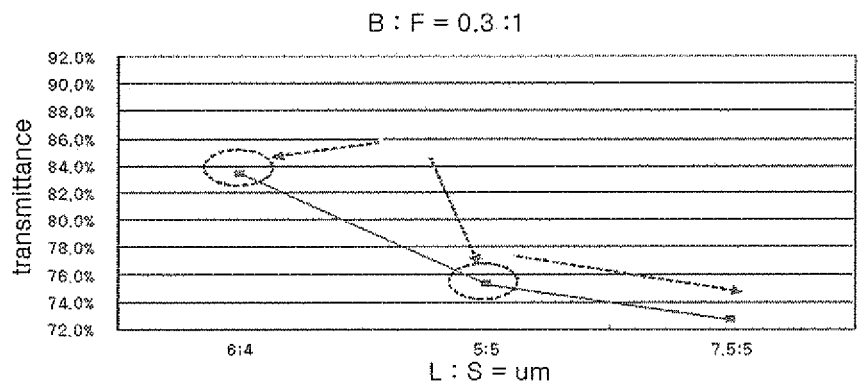

Referring to FIG. 15, transmittances were examined while the distance S between two neighboring edges of two neighboring protrusions 195 and the length L of the second edge 195b were varied as 6 um:4 um, 5 um:5 um, and 7 um:5.5 um. Here, the ratio of the length F of the first edge 195a of the protrusion 195 to the distance B between the cutout 71 of the common electrode 270 and the first envelope EN1 was kept at 1:0.3. Examining the results of FIG. 15, the transmittance decreases as L increases when S is fixed to 5 um.

Figure 16:
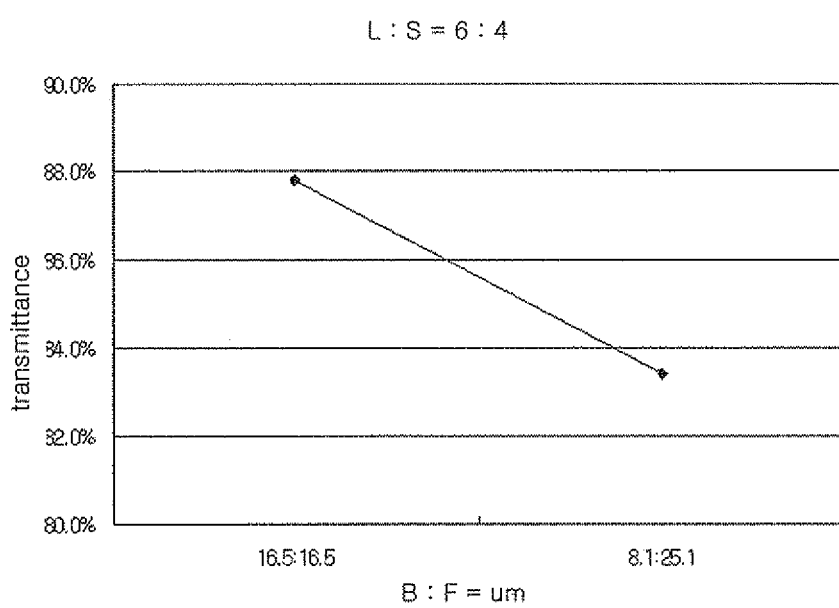
Figure 17:
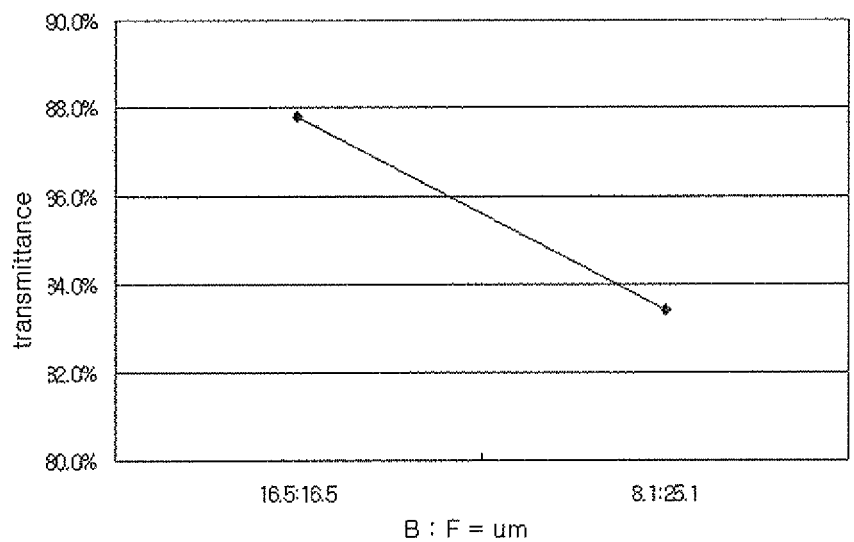

Referring to FIG. 16 and FIG. 17, transmittance was examined while B:F was varied from 16.5:16.5 to 8.1:25.1 with L:S fixed at 6:4. As a result, when F is greater than B, the transmittance decreased, Referring to FIG. 16 and FIG. 17, the ratio of B:F is the same and the pitch is the same at 10 um. However, S is greater than L in FIG. 17 compared to FIG. 16. Here, the transmittance is decreased.

Now, response speed and luminance of an LCD according to an exemplary embodiment of the present invention will be described in detail with reference to FIG. 18A to FIG. 19B.

Figure 18A:
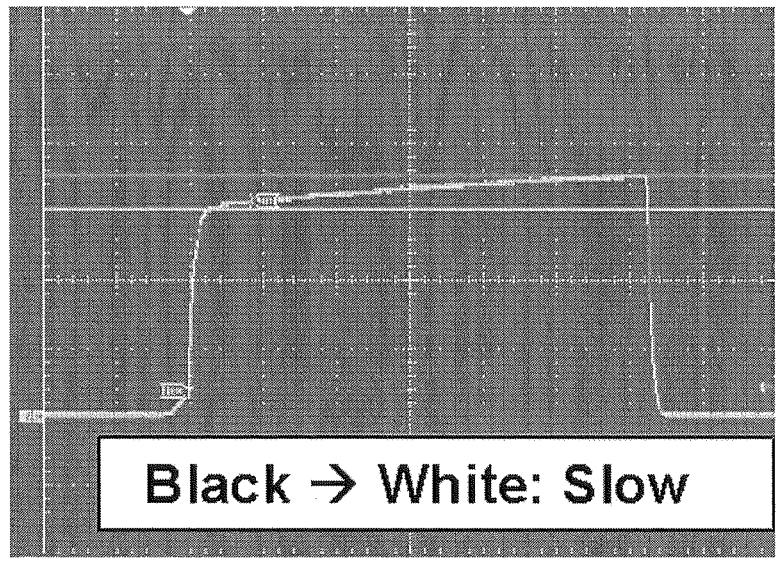
FIG. 18A is a graph illustrating a response speed of an LCD according to the prior art.
Figure 18B:
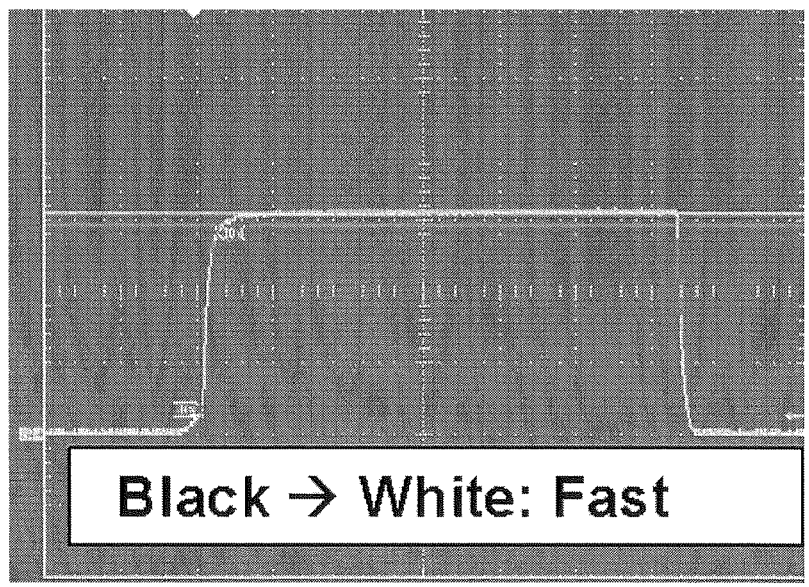
FIG. 18B is a graph illustrating a response speed of an exemplary embodiment of an LCD according to the present invention.

FIG. 18A is a graph illustrating a response speed of an LCD according to the prior art, and FIG. 18B is a graph illustrating a response speed of an exemplary embodiment of an LCD according to the present invention.

Comparing FIG. 18A with FIG. 18B, when the operation of an LCD varies from black to white, the desired luminance level is displayed after a certain time in the case of an LCD according to the prior art. In comparison, as in the illustrated embodiments, luminance is changed to the desired level in the case of an LCD according to the present invention. Therefore, the response speed is relatively fast so that phenomena such as mouse dragging do not occur in an LCD according to the illustrated embodiments.

Figure 19A:
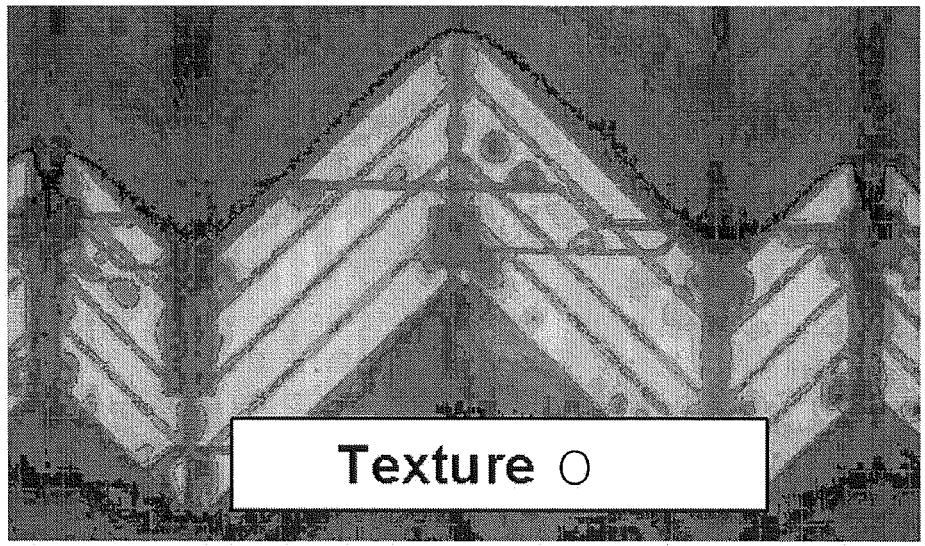
FIG. 19A is a drawing illustrating an operation of an LCD according to the prior art.
Figure 19B:
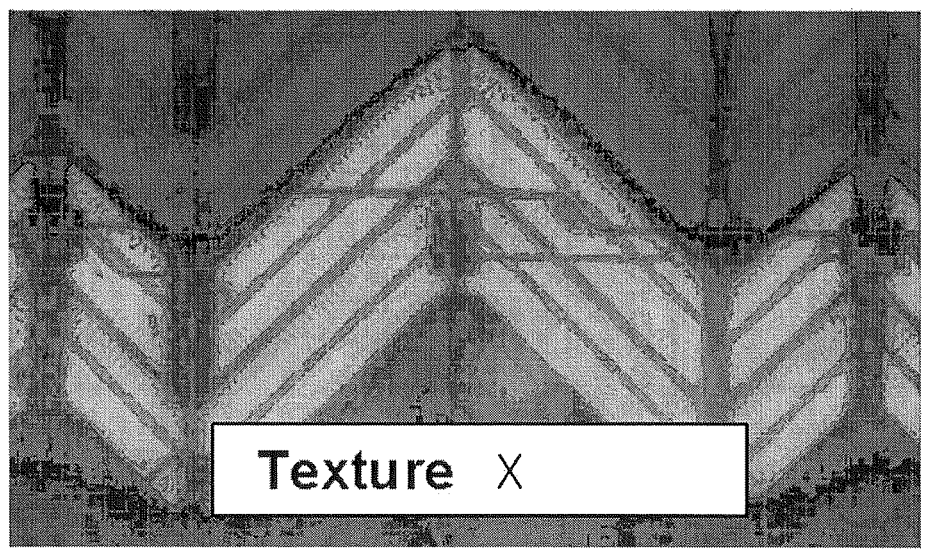
FIG. 19B is a drawing illustrating an operation of an exemplary embodiment of an LCD according to the present invention.

FIG. 19A is a drawing illustrating an operation of an LCD according to the prior art, and FIG. 19B is a drawing illustrating an operation of an exemplary embodiment of an LCD according to the present invention, Examining FIG. 19A, it is shown that texture occurs in the pixel electrodes representing red, green, and blue. On the contrary, in FIG. 19B, an image is displayed relatively clearly without texture occurrence. Therefore, texture does not occur in an LCD according to the illustrated exemplary embodiments, such that the luminance is improved.

As in the illustrated embodiments, the aperture ratio of an LCD can be increased while improving the response speed and the transmittance.

Although preferred embodiments of the present invention have been described in detail hereinabove, it should be clearly understood that many variations and/or modifications of the basic inventive concepts herein taught, which may appear to those skilled in the present art, will still fall within the spirit and scope of the present invention, as defined in the appended claims.

What is claimed is:

1. A liquid crystal display comprising:
   a first substrate;
   a pixel electrode disposed on the first substrate and extended in a first direction;
   a second substrate;
   a common electrode disposed on the second substrate and facing the pixel electrode, and comprising a tilt direction determining member extended parallel to the first direction; and
   a liquid crystal layer interposed between the pixel electrode and the common electrode,
   wherein the pixel electrode comprises:
      an edge portion defined by a plurality of protruded and depressed portions each extended in a second direction inclined with respect to the first direction, and alternately disposed along the first direction, and
      a base portion comprising a base portion edge from which the edge portion extends, and
   wherein for each of the protruded portions, a second direction length F of the protruded portion and a second direction distance B between the base portion edge from which the edge portion extends and the tilt direction determining member of the common electrode, satisfy the following relation:

$F/B \leq 1$.

2. The liquid crystal display of claim 1, wherein
the pixel electrode further comprises a bent portion,
the plurality of protruded portions comprises first protruded portions and second protruded portions,
the first protruded portions are disposed further from the bent portion of the pixel electrode than the second protruded portions, and
for each of the first protruded portions and for each of the second protruded portions, a length F1 of the first protruded portion and a length F2 of the second protruded portion satisfy the following relation:

$F1 < F2$.

3. The liquid crystal display of claim 2,
wherein the pixel electrode further comprises at least two parallelogrammatic electrode pieces of which inclination directions are different from each other, and
wherein the bent portion of the pixel electrode is disposed where the two parallelogrammatic electrode pieces meet each other.

4. The liquid crystal display of claim 3, wherein a tilt direction of at least two of the protruded portions disposed where the two parallelogrammatic electrode pieces meet each other are different from each other.

5. The liquid crystal display of claim 4, wherein a tilt direction determining member of the common electrode comprises a bent portion extended in a third direction inclined with respect to the first direction.

6. The liquid crystal display of claim 5, wherein the second protruded portions comprise a buffer protruded portion extended in a direction between the second direction and the third direction.

7. A liquid crystal display comprising:
a first substrate;
a pixel electrode disposed on the first substrate and extended in a first direction, the pixel electrode comprising a first sub-pixel electrode and a second sub-pixel electrode;
a second substrate;
a common electrode disposed on the second substrate and facing the pixel electrode, and comprising a tilt direction determining member extended parallel to the first direction; and
a liquid crystal layer interposed between the pixel electrode and the common electrode,
wherein
one of the first sub-pixel electrode and second sub-pixel electrode comprises:
an edge portion defined by a plurality of protruded and depressed portions each extended in a second direction inclined with respect to the first direction, and alternately disposed along the first direction, and
a base portion comprising a base portion edge from which the edge portion extends, and
wherein for each of the protruded portions, a second direction length F of the protruded portion and a second direction distance B between the base portion edge from which the edge portion extends and the tilt direction determining member of the common electrode, satisfy the following relation:

$F/B \leq 1$.

8. The liquid crystal display of claim 7, wherein
the pixel electrode further comprises a bent portion,
the plurality of protruded portions comprises first protruded portions and second protruded portions,
the first protruded portions are disposed further from the bent portion of the pixel electrode than the second protruded portions, and
for each of the first protruded portions and for each of the second protruded portions, a length F1 of the first protruded portion and a length F2 of the second protruded portion satisfy the following relation:

$F1 < F2$.

9. The liquid crystal display of claim 8,
wherein the pixel electrode further comprises at least two parallelogrammatic electrode pieces of which inclination directions are different from each other, and
wherein the bent portion of the pixel electrode is disposed where the two parallelogrammatic electrode pieces meet each other.

10. The liquid crystal display of claim 9, wherein a tilt direction of at least two of the protruded portions disposed where the two parallelogrammatic electrode pieces meet each other are different from each other.

11. The liquid crystal display of claim 10, wherein a tilt direction determining member of the common electrode comprises a bent portion extended in a third direction inclined with respect to the first direction.

12. The liquid crystal display of claim 11, wherein the second protruded portions comprise a buffer protruded portion extended in a direction between the second direction and the third direction.

13. A method of manufacturing a liquid crystal display, the method comprising:
providing a pixel electrode on a first substrate and extending in a first direction;
providing a common electrode disposed on a second substrate and facing the pixel electrode, and comprising a tilt direction determining member extended parallel to the first direction; and
interposing a liquid crystal layer between the pixel electrode and the common electrode;
wherein the pixel electrode comprises:
an edge portion defined by a plurality of protruded and depressed portions each extended in a second direction inclined with respect to the first direction, and alternately disposed along the first direction, and
a base portion from which the edge portion extends, and
wherein for each of the protruded portions, a second direction length F of the protruded portion and a second direction distance B between the base portion edge from which the edge portion extends and the tilt direction determining member of the common electrode, satisfy the following relation:

$F/B \leq 1$.

14. A method of forming manufacturing a liquid crystal display, the method comprising:
providing a pixel electrode on a first substrate and extended in a first direction, the pixel electrode comprising a first sub-pixel electrode and a second sub-pixel electrode;
providing a common electrode disposed on a second substrate and facing the pixel electrode, and comprising a tilt direction determining member extended parallel to the first direction; and
interposing a liquid crystal layer between the pixel electrode and the common electrode;

wherein one of the first sub-pixel electrode and second sub-pixel electrode comprises:
  an edge portion defined by a plurality of protruded and depressed portions each extended in a second direction inclined with respect to the first direction, and alternately disposed along the first direction, and
  a base portion form with the edge portion extends,
wherein for each of the protruded portions, a second direction length F of the protruded portion and a second direction distance B between the base portion edge from which the edge portion extends and the tilt direction determining member of the common electrode, satisfy the following relation:

$F/B \leq 1$.

* * * * *